United States Patent
Abhari et al.

(10) Patent No.: US 8,258,892 B2
(45) Date of Patent: Sep. 4, 2012

(54) HIGH-SPEED BANDPASS SERIAL DATA LINK

(75) Inventors: Ramesh Abhari, Montreal (CA);
Asanee Suntives, Toronto (CA);
Gordon W. Roberts, Montreal-West (CA); Nathan Smith, Montreal (CA)

(73) Assignee: The Royal Institution for the Advancement of Learning/McGill University, Montreal, Quebec ( * ) Notice: Subject to any disclaimer, the term of this patent is extended or adjusted under 35 U.S.C. 154(b) by 774 days.

(21) Appl. No.: 12/388,752

(22) Filed: Feb. 19, 2009

(65) Prior Publication Data

US 2009/0220240 A1     Sep. 3, 2009

Related U.S. Application Data

(60) Provisional application No. 61/064,128, filed on Feb. 19, 2008.

(51) Int. Cl.
*H01P 5/12* (2006.01)
*H01P 3/08* (2006.01)

(52) U.S. Cl. .................. 333/135; 333/126; 333/129

(58) Field of Classification Search .......... 333/126–129, 333/132, 134, 135
See application file for complete search history.

(56) References Cited

FOREIGN PATENT DOCUMENTS
EP        1376746 A1 * 1/2004

OTHER PUBLICATIONS

Asanee Suntives, Ramesh Abhari, Transition Structures for 3-D Integration of Substrate Integrated Waveguide Interconnects,IEEE Microwave and Wireless Components Letters, Oct. 2007, pp. 697-699, vol. 17, No. 10.
Asanee Suntives, Ramesh Abhari, Dual-Mode High-Speed Data Transmission Using Substrate Integrated Waveguide Connects, IEEE, 2007, pp. 215-218.
Asanee Suntives, Ramesh Abhari, Investigation of the Performance of an EBG Waveguide-based Interconnect Used as a High-speed Serial Link, . . . IEEE, 2006, pp. 71-74.
Asanee Suntives, Ramesh Abhari, Design and Characterization of the EBG Waveguide-Based Interconnects, IEEE Transactions on Advanced Packaging, May 2007, pp. 163-170, vol. 30, No. 2.
Asanee Suntives, Ramesh Abhari, Experimental Evaluation of Highspeed Data Transmission in a Waveguide-based Interconnect, IEEE Electrical Performance of Electronic Packaging, 2006, pp. 269-272.

* cited by examiner

*Primary Examiner* — Robert Pascal
*Assistant Examiner* — Kimberly Glenn
(74) *Attorney, Agent, or Firm* — Freedman & Associates

(57) ABSTRACT

The present invention relates to a method and system for high-speed bandpass serial data communication. A driver receives at least one data signal and generates a bandpass data signal for transmission through a bandpass waveguide interconnect. The bandpass data signal is launched into the bandpass waveguide interconnect using a first adaptor and extracted therefrom after transmission using a second adaptor. A receiver connected to the second adaptor recovers the at least one data signal from the extracted bandpass data signal. A dispersion compensation circuit receives one of the at least one data signal and the bandpass data signal and information indicative of a phase response of the bandpass waveguide interconnect and dispersion compensates the one of the at least one data signal and the bandpass data signal by compensating the phase response of the bandpass waveguide interconnect.

43 Claims, 31 Drawing Sheets

TE$_{20}$

HIGH-SPEED BANDPASS SERIAL DATA LINK

FIELD OF THE INVENTION

This invention relates generally to the field of data communication and more particularly to a method and apparatus for high-speed bandpass serial data communication.

BACKGROUND OF THE INVENTION

In modern telecommunication and computer systems parallel Input/Output (I/O) communication links are increasingly replaced by serial high-speed I/O communication links. To provide high data transmission rates—in the gigabit range—using parallel communication links several hundred parallel data lines are generally required. However, extreme difficulties in controlling crosstalk and synchronizing large numbers of parallel data lines substantially limit maximum achievable data transmission rates. Furthermore, parallel high-speed communication links require: a large number of I/O connections; large routing space; and a substantially amount of power due to the multiplicity of components.

In point-to point serial high-speed I/O communication links, a plurality of parallel data lines are multiplexed using a serializer and transmitted using a single data line. At the receiving end, a de-serializer de-multiplexes the serial high speed data signal into its original parallel form. This technique significantly reduces the number of I/O connections; routing space; and amount of power consumed compared to the parallel Input/Output (I/O) communication links, as well as substantially reduces skew.

Unfortunately, there is an inherent problem associated with serial communication links which is their lowpass characteristic limiting the transmission rate. The limitation of the transmission data rate is caused by the type of material and interconnect used for signal transmission.

Commonly, low cost Flame Retardant 4 (FR4)—based materials are used to manufacture Printed Circuit Boards (PCBs) and backplanes. However, frequency-dependent losses from this type of material make digital baseband transmission susceptible to Inter-Symbol Interference (ISI) at data transmission rates in the multi gigabit range. For example, a stripline in a typical backplane has a length of 0.5 m or more. The insertion loss of the stripline over the total length of 0.5 m is more than 20 dB at 10 GHz. Furthermore, crosstalk is of increasing concern, due to shrinking sizes and increasing currents in modern electronic systems.

It would be highly desirable to overcome these drawbacks and to provide a method and system for high-speed bandpass serial data communication.

SUMMARY OF THE INVENTION

It is, therefore, an object of the invention to provide a method and system for high-speed serial data communication.

In accordance with embodiments of the present invention there is provided a system comprising:
a driver for receiving a data signal and for generating a bandpass data signal within a predetermined frequency band in dependence thereupon;
a bandpass waveguide interconnect for guiding the bandpass data signal along a predetermined path between a first location and a second location;
a first adaptor coupled to the driver and to the bandpass waveguide interconnect at the first location for launching the bandpass data signal into the bandpass waveguide interconnect;
a second adaptor connected to the bandpass waveguide interconnect at the second location for extracting the transmitted bandpass data signal from the bandpass waveguide interconnect;
a receiver coupled to the second adaptor for recovering the data signal from the extracted bandpass data signal; and,
a dispersion compensation circuit for receiving one of the data signal and the bandpass data signal and for dispersion compensating the one of the data signal and the bandpass data signal by compensating the phase response of the bandpass waveguide interconnect.

In accordance with embodiments of the present invention there is further provided a method comprising:
receiving a data signal;
processing the data signal for generating a bandpass data signal within a predetermined frequency band;
launching the bandpass data signal into a bandpass waveguide interconnect, the bandpass data signal propagating through the bandpass waveguide interconnect;
extracting the transmitted bandpass data signal from the bandpass waveguide interconnect; processing the extracted bandpass data signal for recovering the data signal; and,
based on a phase response of the bandpass waveguide interconnect, dispersion compensating one of the at least one data signal and the bandpass data signal by compensating the phase response of the bandpass waveguide interconnect.

In accordance with embodiments of the present invention there is yet further provided a device comprising:
a dielectric substrate; and,
a bandpass waveguide interconnect for transmitting a data signal along a predetermined path in the dielectric substrate, the predetermined path having at least a substantially right-angle bend, the bandpass waveguide interconnect comprising:
  a first and a second conducting layer disposed on a top surface and a bottom surface of the dielectric substrate, respectively; and,
a first set of inter-layer conductors connecting the first and the second conducting layers, the first set disposed along a first path; and,
  a second set of inter-layer conductors disposed along a second path spaced apart from the first path and forming a bounded region having a cross section defined by the first and second conducting layers on two sides and by the first and second set of inter-layer conductors on two other sides thereof the first path and the second path each forming an approximately right angle along a length thereof.

In accordance with embodiments of the present invention there is yet further provided a device comprising:
a dielectric substrate; and,
a plurality of N parallel bandpass waveguide interconnects for transmitting a plurality of data signals along a predetermined path in the dielectric substrate, the plurality of N parallel bandpass waveguide interconnects comprising:
  a first and a second conducting layer disposed on a top surface and a bottom surface of the dielectric substrate, respectively; and,
  a plurality of N+1 rows of conducting inter-layer conductors connecting the first and the second conducting layer, the plurality of N+1 rows of conducting inter-layer conductors being disposed at predetermined distances and oriented substantially parallel to each other.

In accordance with embodiments of the present invention there is yet further provided a device comprising:

a dielectric substrate;

a bandpass waveguide interconnect for transmitting a first data signal along a predetermined path in the dielectric substrate, the bandpass waveguide interconnect comprising:

a first and a second conducting layer disposed on a top surface and a bottom surface of the dielectric substrate, respectively; and, a first set of inter-layer conductors connecting the first and the second conducting layers, the first set disposed along a first path; and, a second set of inter-layer conductors disposed along a second path spaced apart from the first path and forming a bounded region having a cross section defined by the first and second conducting layers on two sides and by the first and second set of inter-layer conductors on two other sides thereof; and, at least a strip of a conducting material having a predetermined width for transmitting at least a second data signal, the at least a strip of conducting material being disposed along at least a portion of the predetermined path within the wave guide interconnect and oriented substantially parallel to the first and the second row of conducting inter-layer conductors.

In accordance with embodiments of the present invention there is yet further provided a device comprising:

a dielectric substrate;

a bandpass waveguide interconnect for simultaneously transmitting a plurality of bandpass data signals along a predetermined path in the dielectric substrate, the bandpass waveguide interconnect comprising:

a first and a second conducting layer disposed on a top surface and a bottom surface of the dielectric substrate, respectively; and, a first set of inter-layer conductors connecting the first and the second conducting layers, the first set disposed along a first path; and, a second set of inter-layer conductors disposed along a second path spaced apart from the first path and forming a bounded region having a cross section defined by the first and second conducting layers on two sides and by the first and second set of inter-layer conductors on two other sides thereof; and, a plurality of adaptors connected to the bandpass waveguide interconnect, each of the plurality of adaptors for launching one of the plurality of bandpass data signals such that the respective bandpass data signal is transmitted using a predetermined transmission mode, and wherein the plurality of bandpass data signals are transmitted using different transmission modes.

In accordance with embodiments of the present invention there is yet further provided a method comprising:

receiving a plurality of data signals;

processing the plurality of data signals for generating a first bandpass data signal within a predetermined first frequency band and second bandpass data signal within a second predetermined frequency band;

launching the first bandpass data signal into a bandpass waveguide interconnect such that the first bandpass data signal is transmitted using a first transmission mode;

launching the second bandpass data signal into the same bandpass waveguide interconnect such that the second bandpass data signal is transmitted using a second other transmission mode, the first and second bandpass data signals propagating through the bandpass waveguide interconnect simultaneously;

extracting the first bandpass data signal from the bandpass waveguide interconnect;

extracting the second bandpass data signal from the bandpass waveguide interconnect; and, processing the extracted first and second bandpass data signal for recovering the plurality of data signals In accordance with embodiments of the present invention there is yet further provided a device comprising;

a strip of a flexible dielectric substrate; and, a bandpass waveguide interconnect for transmitting a data signal along the strip of a flexible dielectric substrate, the bandpass waveguide interconnect comprising:

a first and a second flexible conducting layer disposed on a top surface and a bottom surface of the strip of a flexible dielectric substrate, respectively; and, a first and a second row of conducting inter-layer conductors connecting the first and the second conducting layer, the second row of conducting inter-layer conductors being disposed at a predetermined distance and oriented substantially parallel to the first row of conducting inter-layer conductors along the strip of a flexible dielectric substrate.

BRIEF DESCRIPTION OF THE FIGURES

Exemplary embodiments of the invention will now be described in conjunction with the following drawings, in which.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figures 1A, 1B:
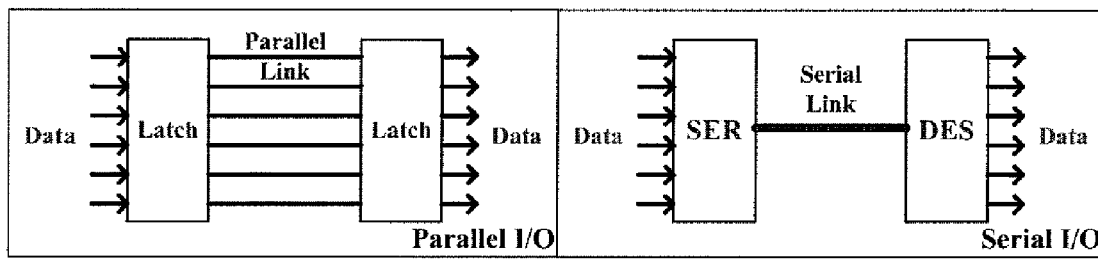
FIGS. 1a and 1b are a simplified block diagrams illustrating a parallel and a serial data communication link, respectively.

In modern telecommunication and computer systems parallel Input/Output (I/O) communication links are increasingly replaced by serial high-speed I/O communication links. To provide high data transmission rates—in the gigabit range—using parallel communication links several hundred parallel data lines are generally required, as shown in FIG. 1a. In serial point-to-point high-speed I/O communication links a plurality of parallel data signals are multiplexed or serialized and then transmitted using a single communication link, as shown in FIG. 1b. At the receiving end a de-serializer or de-multiplexer recovers the original parallel data signals.

Figure 2:
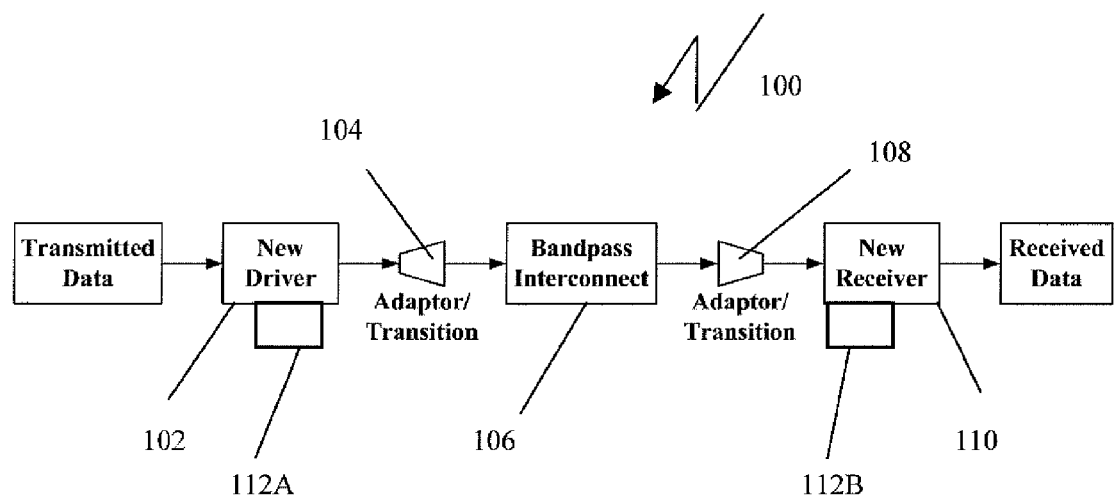
FIG. 2 is a simplified block diagram of a system for high-speed bandpass serial data communication.
Figure 3:
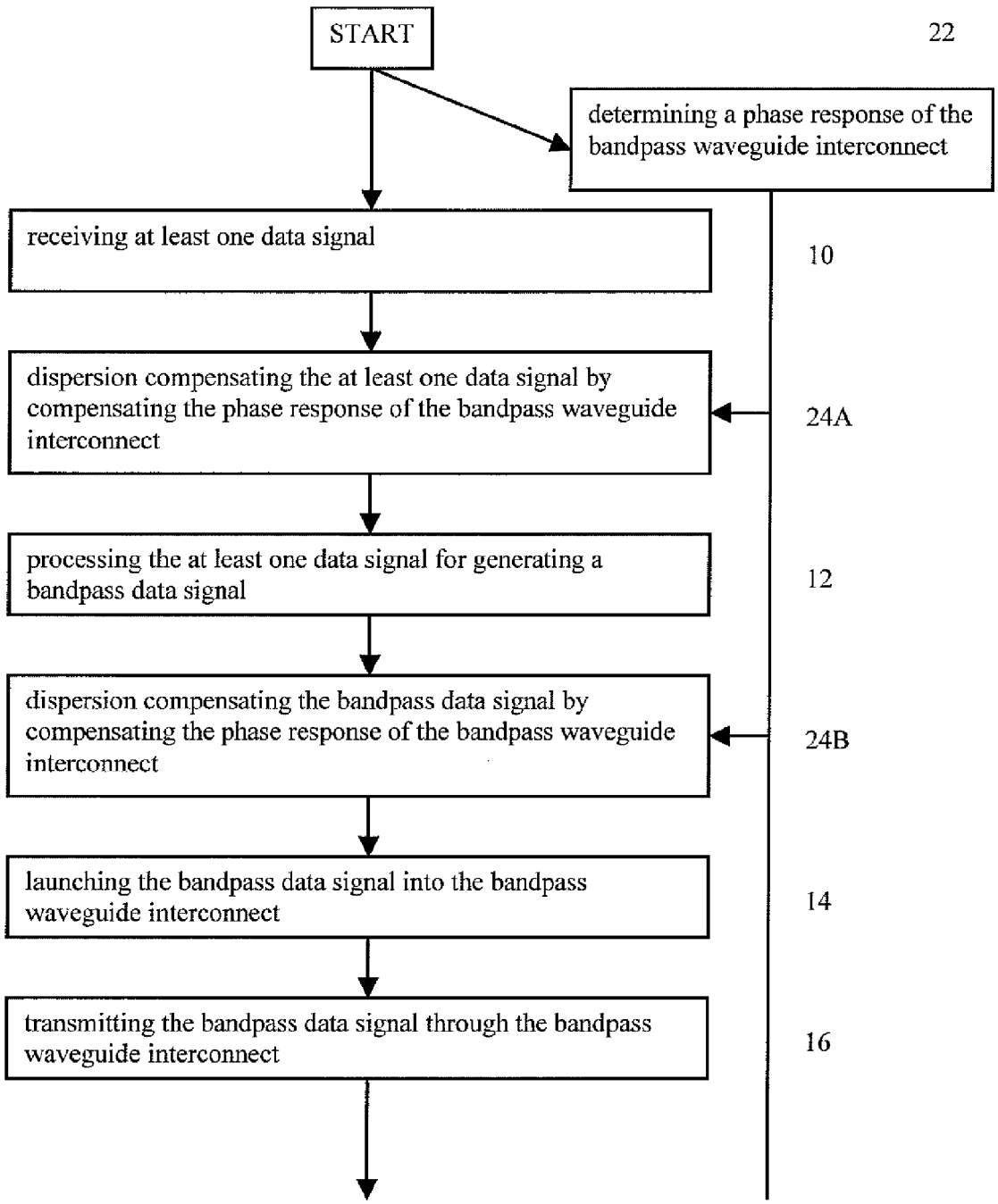
FIG. 3 is a simplified flow diagram of a method for high-speed bandpass serial data communication.
Figure 3:
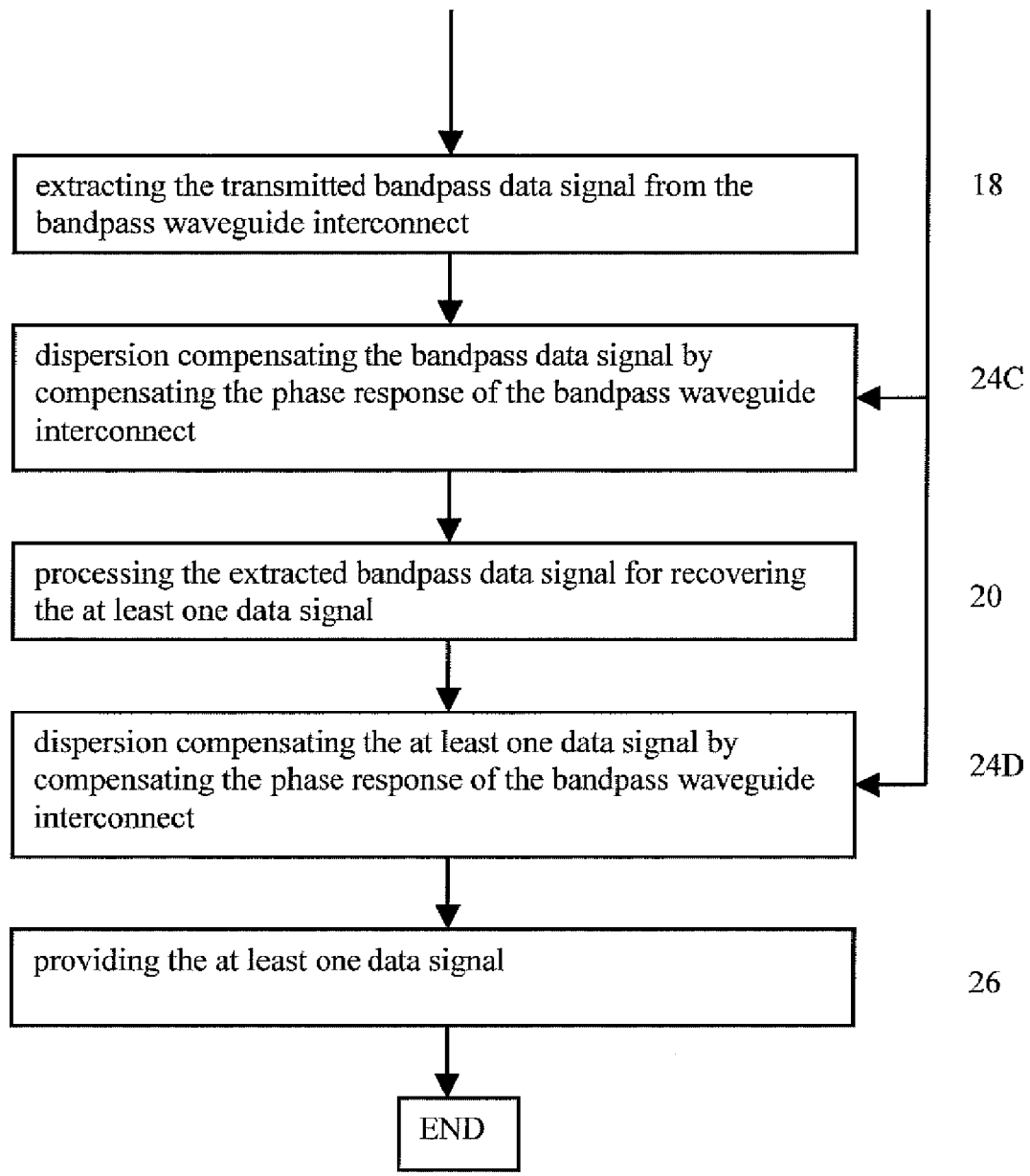

Referring to FIGS. 2 and 3, a simplified block diagram of a system 100 and a simplified flow diagram of a method for high-speed bandpass serial data communication according to the invention are shown, respectively. The system 100 overcomes the inherent problem limiting the data transmission rate due to the low pass characteristic of the serial communication links and, at the same time, provides a low cost solution which is possible to implement using existing PCB technology and low cost PCB materials. The system 100 comprises a bandpass waveguide interconnect 106 for transmitting a bandpass data signal along a predetermined path between a first location and a second location, for example, between a processor disposed on a PCB and a respective I/O terminal. Driver 102 receives a plurality of parallel data signals—at 10—and generates a bandpass data signal within a predetermined frequency band in dependence thereupon by serializing or multiplexing the parallel data signals—at 12. The bandpass data signal is then launched—at 14—into the bandpass waveguide interconnect 106 using first adaptor 104.

After transmission—at 16—through the bandpass waveguide interconnect 106 the transmitted bandpass data signal is extracted—at 18—from the bandpass waveguide interconnect 106 using second adaptor 108. Receiver 110 then de-serializes or de-multiplexes the extracted bandpass data signal—at 20—to recover the original parallel data signals therefrom prior to provision—at 26—to, for example, a processor for further processing. In order to enable reliable transmission at high data transmission rates the data signals are processed—at 24—to compensate for the dispersion the bandpass data signal experiences during the transmission through the bandpass waveguide interconnect 106. The dispersion characteristic of the bandpass waveguide interconnect 106 is, for example, derived from an electromagnetic field analysis—at 22. Dispersion compensation circuit 112A, 112B receives one of the parallel data signals and the bandpass data signal as well as information indicative of a phase response—dispersion characteristic—of the bandpass waveguide interconnect 106 and dispersion compensates the received data signal by compensating the phase response of the bandpass waveguide interconnect 106. The dispersion circuit 112A, 112B is disposed, for example, in one of the driver 102 and the receiver 110 or both. The dispersion compensation is performed: at 24A—dispersion compensating the plurality of parallel data signals prior transmission of the bandpass data signal; at 24B—dispersion compensating the bandpass data signal prior transmission; at 24C—dispersion compensating the bandpass data signal after transmission; or, at 24D—dispersion compensating the plurality of parallel data signals after transmission of the bandpass data signal.

In order to perform dispersion compensation, several options are presented herein though they are not intended to be limiting. A first dispersion compensator for SIW interconnects comprises a waveguide having changing width thereby varying the H-plane width. Since dispersion is most significant near the SIW cut-off frequency and the H-plane width is related to the cut-off frequency, changing the H-plane width varies the dispersion characteristics of the waveguide. The H-plane width is optionally varied in a linear fashion. Alternatively, is it altered in a sinusoidal fashion. Preferably, the H-plane width is varied for modifying the impedance, cut-off frequency, and reflection and propagation coefficients of the waveguide.

Another dispersion compensator comprises equalizing dispersion in waveguide interconnects. For example, a reactive power reflector possessing a phase response for dispersion compensation is provided. In the power reflector configuration, a circulator or a coupler is used to ensure the reflected power is delivered to the output port of the equalizer system while isolating the input port from reflected signal power. In a configuration shown in FIG. 9c and relying on a circulator 9300, the dispersive SIW interconnect 9301 is coupled to a first port 9300a of the circulator 9300 for providing a signal thereto. Power is transmitted to the second port 9300b of the circulator 9300 from the first port as is well understood in the art of circulator design. At the second port 9300b of the circulator 9300 an H-plane tapered SIW equalizer section 9305 is coupled. The taper of the H-plane tapered SIW equalizer 9305 controls the depth at which various frequencies within the interconnect bandwidth penetrate into the equalizer before being reflected and subsequently incident at the second port 9300b of the circulator 9300. By controlling the depth at which different frequencies penetrate into the equalizer, it is possible to control the time of flight of different frequencies, thus providing somewhat independent control over the phase for different frequencies. An ideal circulator passes the equalized broadband signal from the second port

9300*b* to the third port 9300*c* in the form of the output port, of the dispersion compensator. A similar arrangement and operation can be implemented by using a coupler which can be a 4 port SIW device. The first port is connected to the dispersive SIW. Two ports of the coupler are connected to H-plane tapered SIW equalizers. The 4th port is the output port delivering the equalized signal.

Figure 9A:
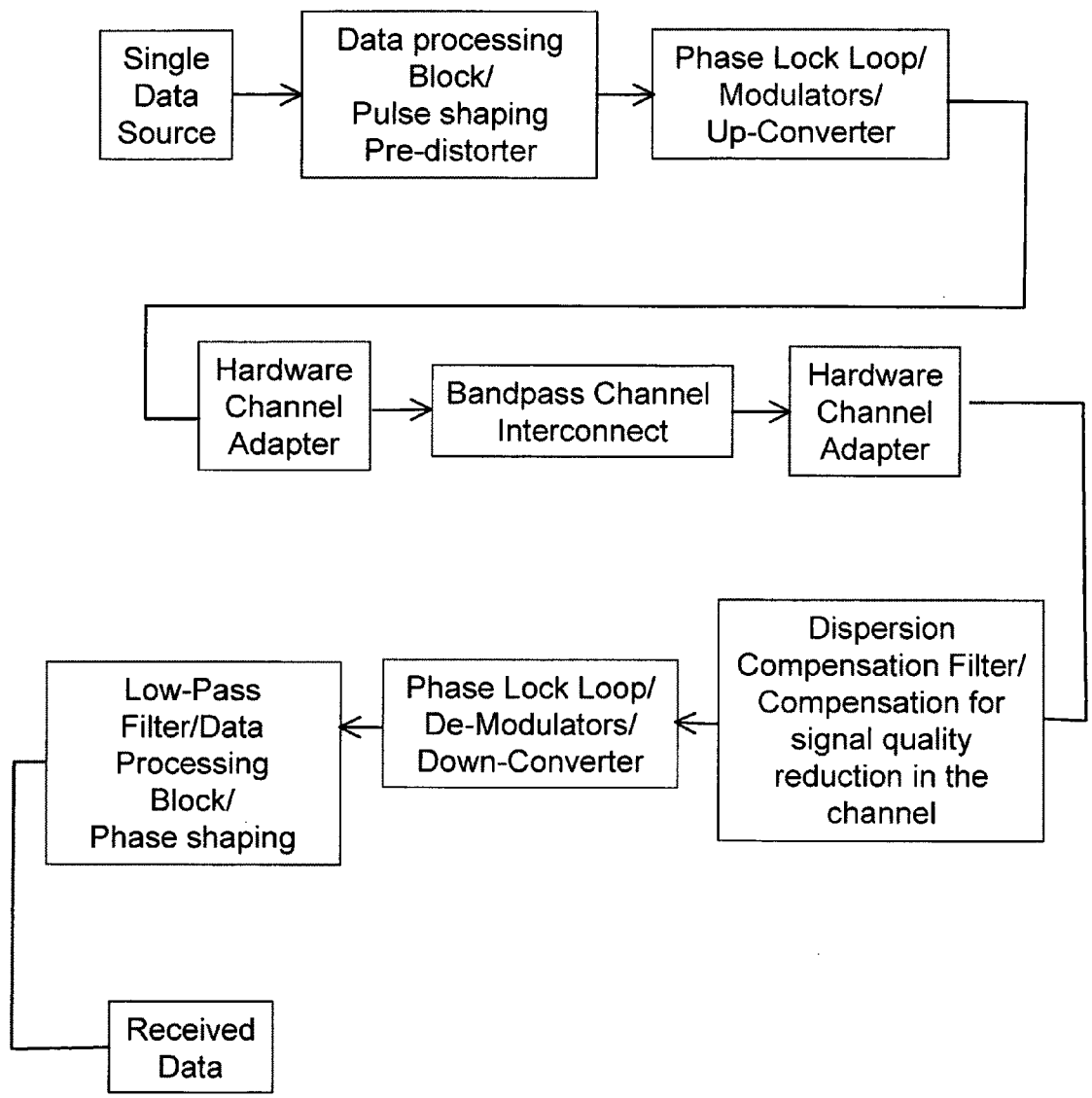
FIGS. 9a, 9b, 9c, and 9d are simplified block diagrams illustrating example implementations of dispersion compensation in the system illustrated in FIG. 2.
Figure 9B:
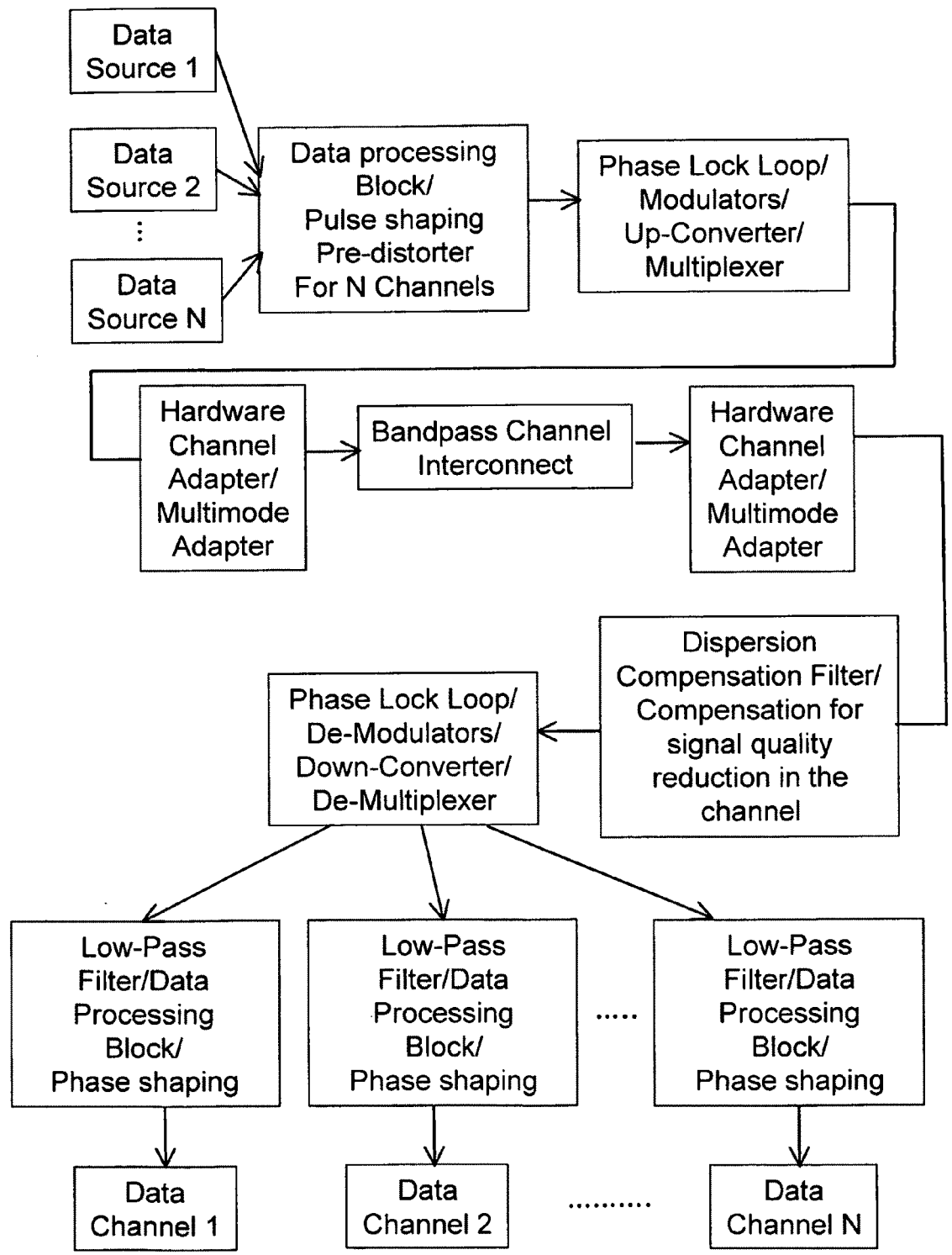
Figure 9C:
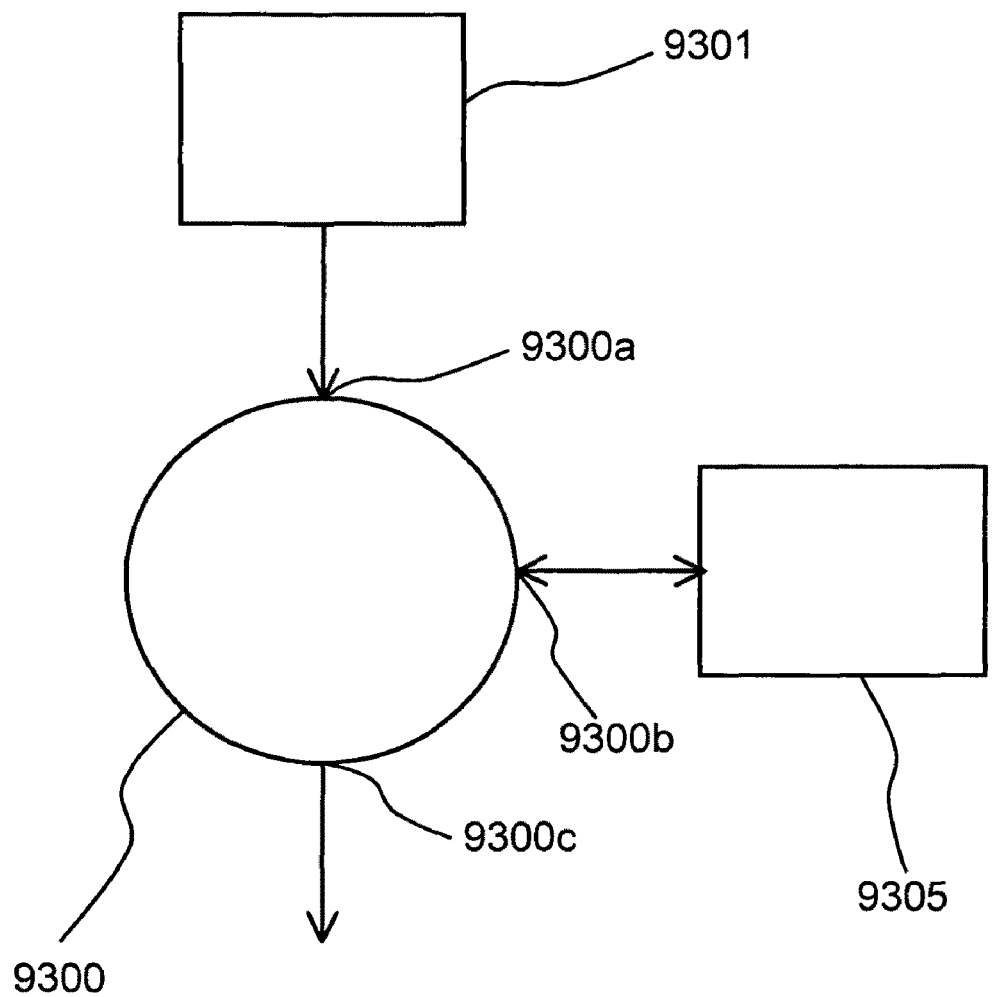
Figure 9D:
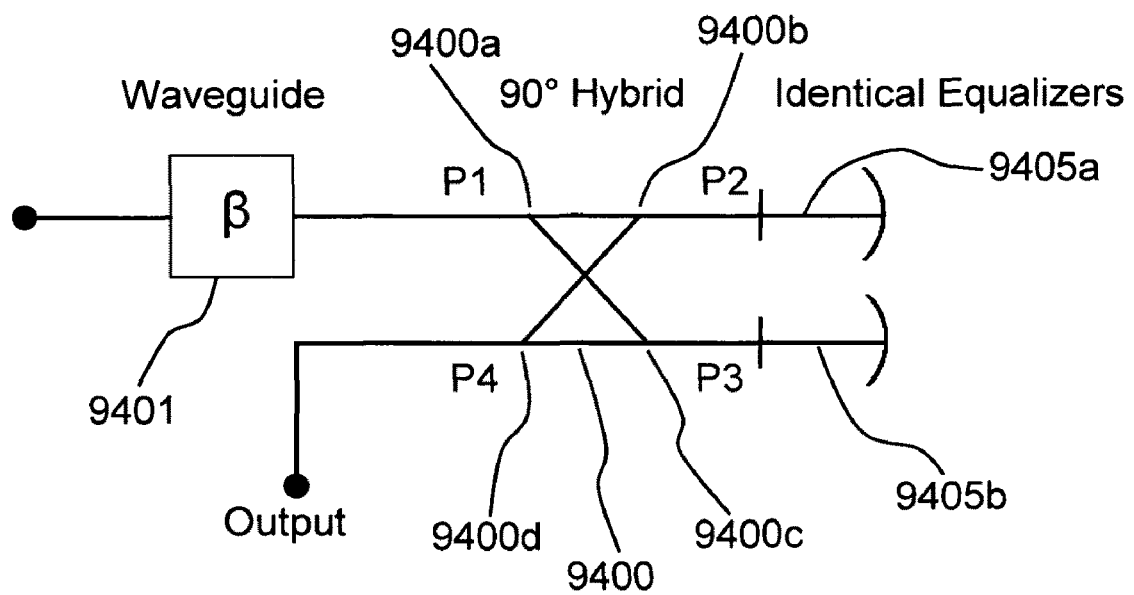

Yet another dispersion compensator shown in FIG. 9*d* employs a 90-degree hybrid 9400 with a dispersive SIW 9401 connected at the first port 9400*a* with two tapered SIW equalizer sections 9405 *a* and 9405*b* coupled at the second port 9400*b* (through) and third (forward coupled 90-degree) port 9400*c* of a circulator with the fourth port 9400*d* forming the output port. Power injected at the first port propagates to the second port and is coupled with a 90-degree phase shift to the third port. The equalizer sections reflect the incident power coupling to the first and fourth ports, adding destructively at the input port and adding constructively at the output port, thus providing a dispersion compensated signal at the output port.

In another configuration, the dispersion compensator is implemented using pre or post processing. A multi-mode dispersion-less SIW interconnect relies on transducers at an input port to launch and at an output port to retrieve signals propagating in different modes. A mode-specific dispersion equalizer is optionally implemented as a pre or post-compensating device and applied to each signal propagating in each different mode. Of course, such a pre or post compensating device is optionally implemented in electronic circuitry before or after the transducer. Further optionally, the compensating device is implemented both pre and post for performing some compensation before and other compensation afterward.

Further alternatively, the dispersion compensator comprises a hybrid of the dispersion compensators presented hereinabove wherein some pre/post compensation is performed and then other compensation is performed to the signal during propagation thereof.

Figure 4:
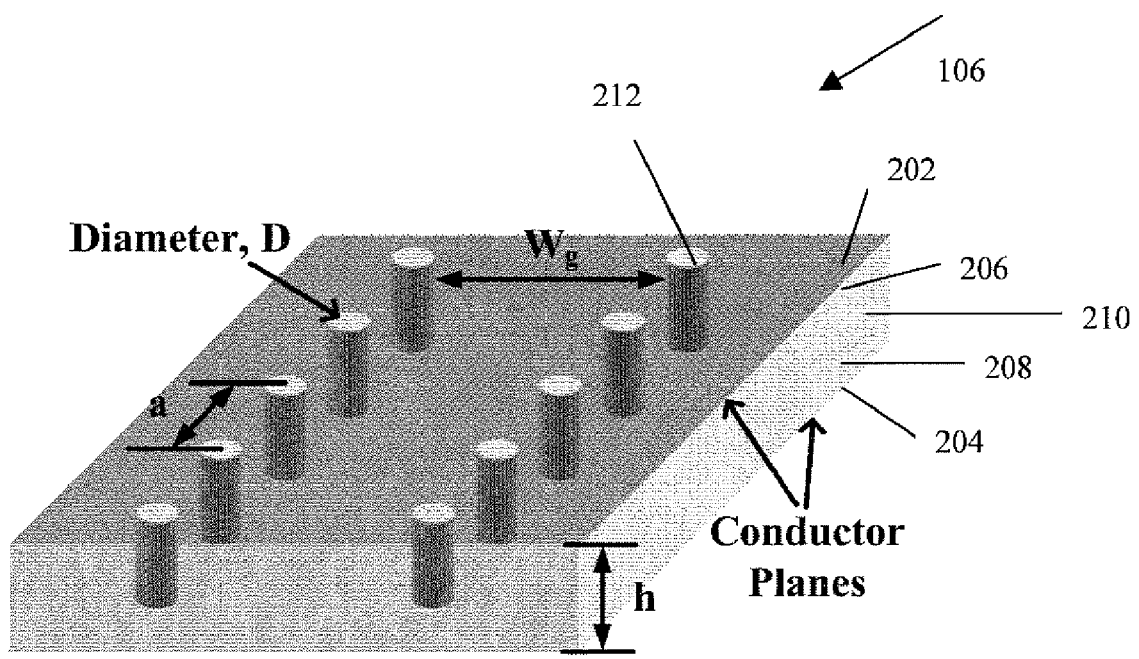
FIG. 4 is a perspective view of a bandpass waveguide interconnect employed in the system illustrated in FIG. 2.

Referring to FIG. 4, a perspective view of the bandpass waveguide interconnect 106 is shown. The bandpass waveguide interconnect 106 is formed between a first conducting layer 202 and a second conducting layer 204 disposed on a top surface 206 and a bottom surface 208 of a dielectric substrate 210. A first and a second row of conducting inter-layer conductors in the form of vias 212 connect the first conducting layer 202 and the second conducting layer 204. The second row of conducting inter-layer conductors 212 is disposed at a predetermined distance $W_g$ and oriented substantially parallel to the first row of conducting inter-layer conductors 212 along the predetermined path. Therefore, the bandpass waveguide interconnect 106 has a substantially rectangular cross section formed between the first conducting layer 202 and the second conducting layer 204 and the first and the second row of inter-layer conductors 212 with the signal propagation being substantially confined therein along the predetermined path. For given dielectric properties of the substrate material, a given thickness h of the substrate 210, and a given frequency range of the bandpass data signals to be transmitted, it is possible to design the bandpass waveguide interconnect 106—diameter D of the inter-layer conductors 212, distance a between subsequent inter-layer conductors 212, and predetermined distance $W_g$ such that it exhibits substantially negligible leakage when guiding the signals along the predetermined path including sharp bends, i.e. a single row of inter-layer conductors 212 on each side of the waveguide is sufficient to emulate a solid wall. The bandpass waveguide interconnect 106 is, for example, implemented between conducting metal layers of a backplane or a PCB made of a FR4™, Rogers 3006™ or Rogers 4003C™ substrate. The conducting metal layers are then connected by the inter-layer conductors 212, for example, each inter-layer conductor 212 being implemented as a bore having a conducting material—metal—deposited on its surface. Design examples of implemented bandpass waveguide interconnects are described in more detail in Appendices A, B, C, and D.

The bandpass waveguide interconnect 106 has a transmission characteristic in which signal transmission starts at the cutoff frequency of the fundamental $TE_{10}$ mode. Single mode transmission exists in the frequency band between the $TE_{10}$ and $TE_{20}$ cutoff frequencies. The $TE_{10}$ mode has still a high transmission coefficient in a wide frequency range, without substantial coupling to the $TE_{20}$ and $TE_{30}$ modes, beyond the cutoff frequency of the second transmission mode. The $TE_{m0}$ modes, (m=1, 2, 3, ... ), are the dominant modes, since the waveguide thickness—corresponding to the substrate thickness h—is substantially smaller than its width $W_g$. Therefore, it is possible to operate bandpass waveguide interconnect 106 beyond the single mode region and to extend the bandwidth of operation to frequency ranges needed in high-speed and ultra-wide-band applications.

Figure 5:
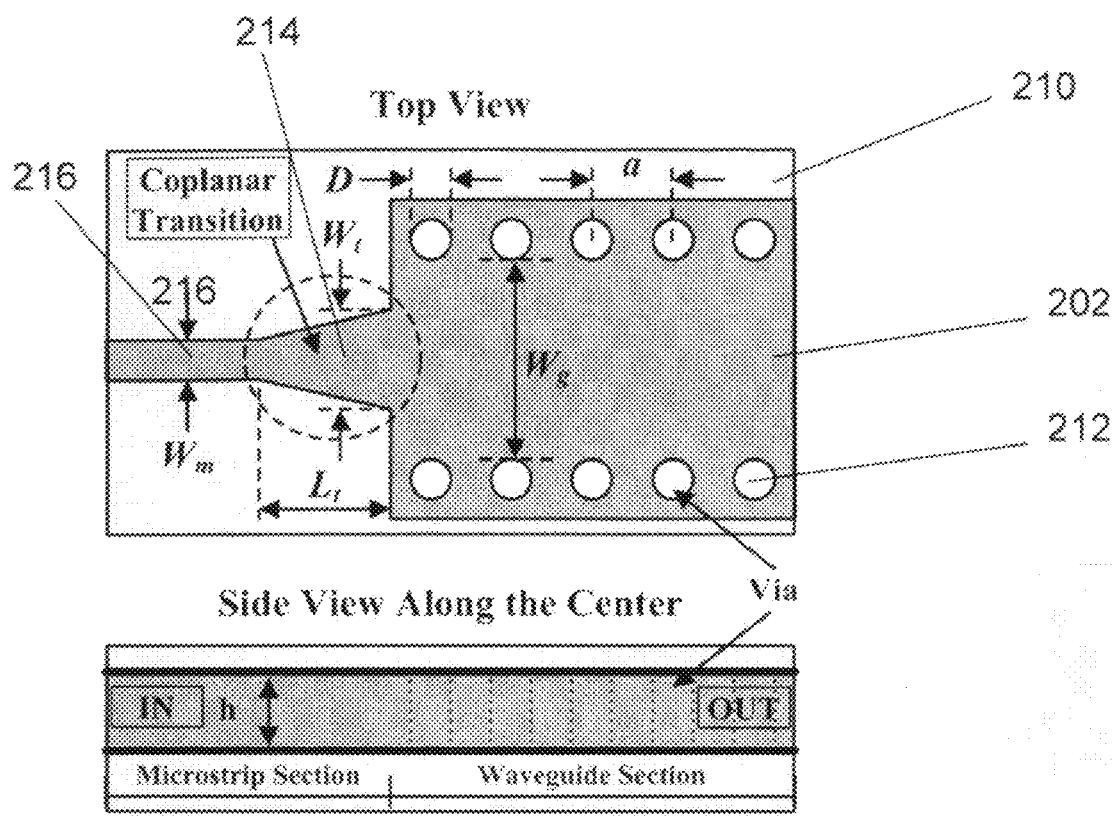
FIG. 5 is a simplified diagram illustrating a coplanar microstrip-to-bandpass waveguide interconnect transition.

In order to launch the bandpass data signal into the bandpass waveguide interconnect 106 and to extract the same after transmission the adaptors 104 and 108 are provided for connecting the bandpass waveguide interconnect 106 to microstrip or stripline structures of a PCB or backplane. FIG. 5 illustrates a coplanar microstrip-to-bandpass waveguide interconnect transition for use as the adaptors 104 and 108. The transition comprises a tapered microstrip line with the design parameters transition width $W_t$ and transition length $L_t$. The transition 214 illustrated in FIG. 5 has been shown to be simple and very effective in a wide frequency range. Of course there are numerous other possibilities for launching the bandpass data signal into the bandpass waveguide interconnect 106 such as, for example, a conducting inter-layer conductor placed in the center of the waveguide and connected to a microstrip line.

Figure 6:
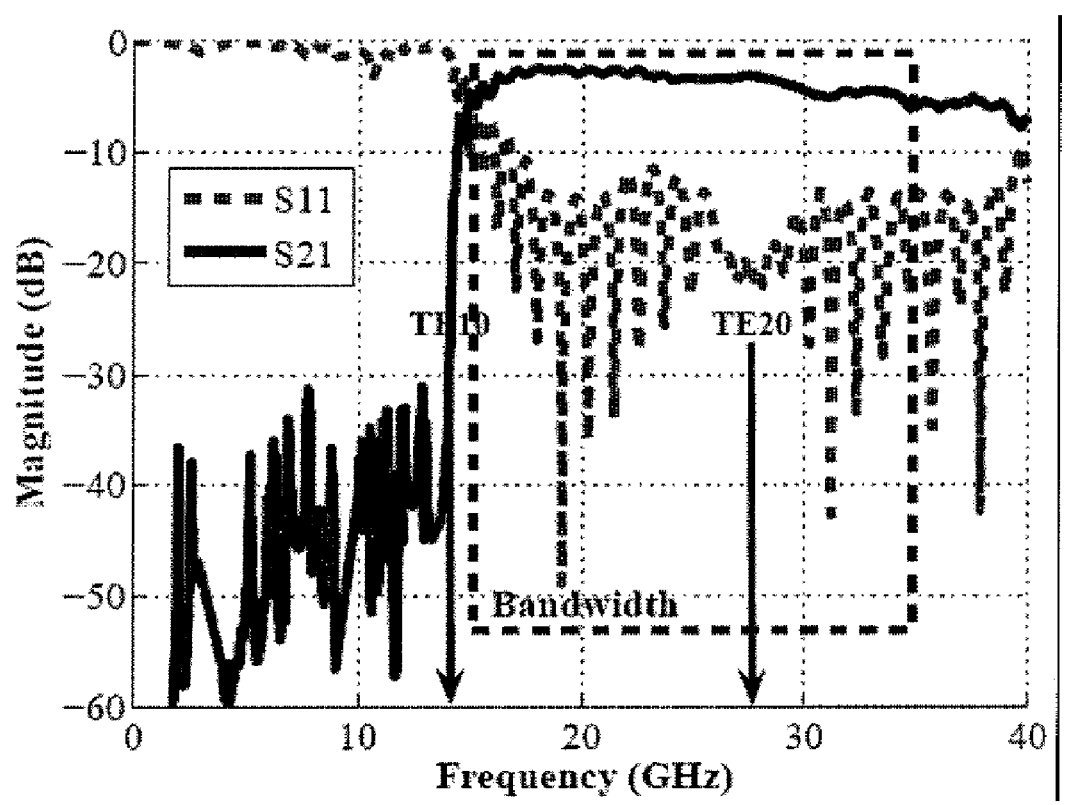
FIG. 6 is a diagram illustrating an S-parameter characteristic of the bandpass waveguide interconnect.

Referring to FIG. 6, an S-parameter characteristic of the bandpass waveguide interconnect 106 with the transitions illustrated in FIG. 5 is shown. A 49 mm long waveguide has been fabricated on a Rogers 3006™ substrate. The lowest cutoff frequency is 13.9 GHz and the 3-dB bandwidth of the waveguide—19 GHz—extends beyond the single mode region, i.e. from 13.9 GHz to 27.8 GHz. The minimum insertion loss is 2.44 dB.

In order to enable transmission of digital data signals through the bandpass waveguide interconnect 106 the driver 102 and the receiver 110 are adapted for bandpass transmission. Mixers are utilized for up-conversion—driver—and down-conversion—receiver—of the digital data signals, modulation/de-modulation and low pass filtering are employed in the driver 102 and the receiver 110. The mixer specifications satisfy the bandwidth requirement of the baseband signal ($B_{signal}$) and the specified modulating frequency ($f_{LO}$). Specifically, the mixer Intermediate Frequency (IF) bandwidth covers a frequency range from DC-$B_{signal}$, and the Radio Frequency (RF) bandwidth falls between $f_{LO}$-$B_{signal}$ and $f_{LO}$+$B_{signal}$. The lowpass filter recovers the demodulated baseband portion, i.e. 3-dB bandwidth of $B_{signal}$ or more. Furthermore, the lowpass filter removes an undesired image signal resulting from the down-conversion with center frequency of $2f_{LO}$. Therefore, the stopband of the filter has a large attenuation (>20 dB) substantially before $2f_{LO}$-$B_{signal}$. The conversion loss of a mixer substantially reduces the amplitude of the received data signal. A Low-Noise Amplifier (LNA) is employed in the receiver to address signal attenuation. Alternatively, a decision circuit is adapted to accommodate changes in data signal levels when making decisions. Though exact ranges of frequency are presented above, in some cases approximating these ranges results in suitable performance and as such the ranges presented are suggested ranges depending on applications and performance specifications.

Figure 7A:
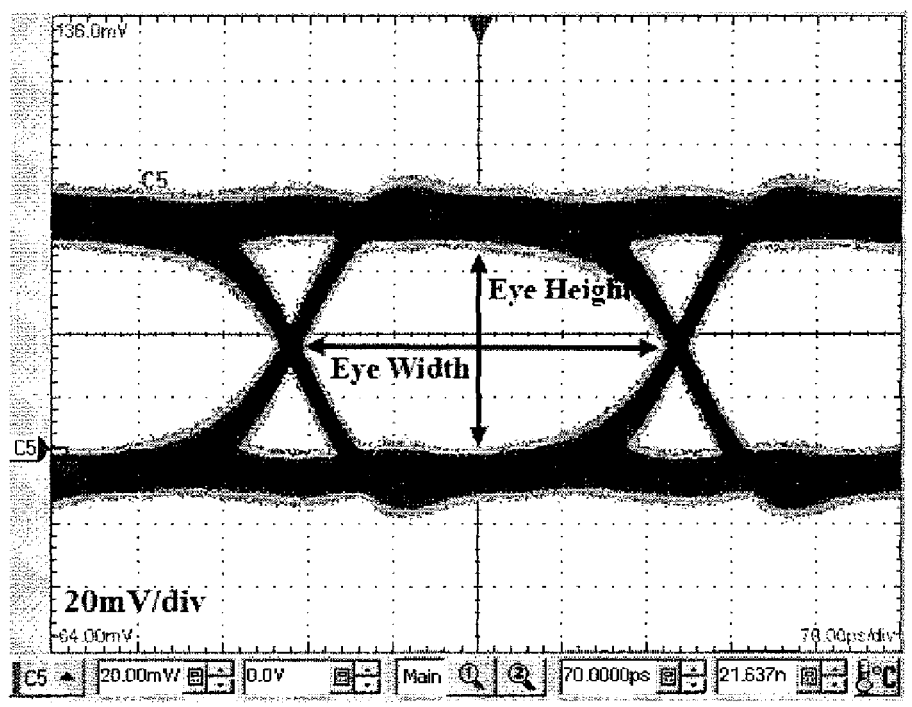
FIGS. 7a and 7b illustrate eye diagrams of the system illustrated in FIG. 2.
Figure 7B:
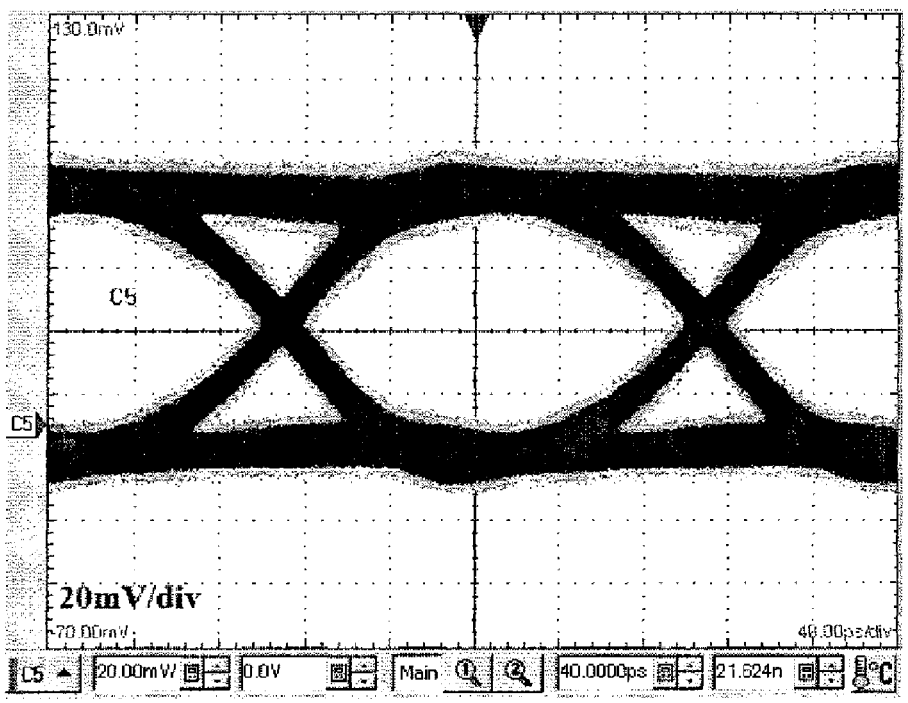

A bandpass data link system comprising the bandpass waveguide interconnect 106 with the transitions illustrated in FIG. 5 was implemented as described above. Referring to FIGS. 7a and 7b, eye diagrams for the system are presented for 3.125 Gb/s and 5 Gb/s data transmission rates, respectively. FIGS. 7a and 7b illustrate that the system achieved a very good eye opening at high-speed data transmission rates.

Figure 8:
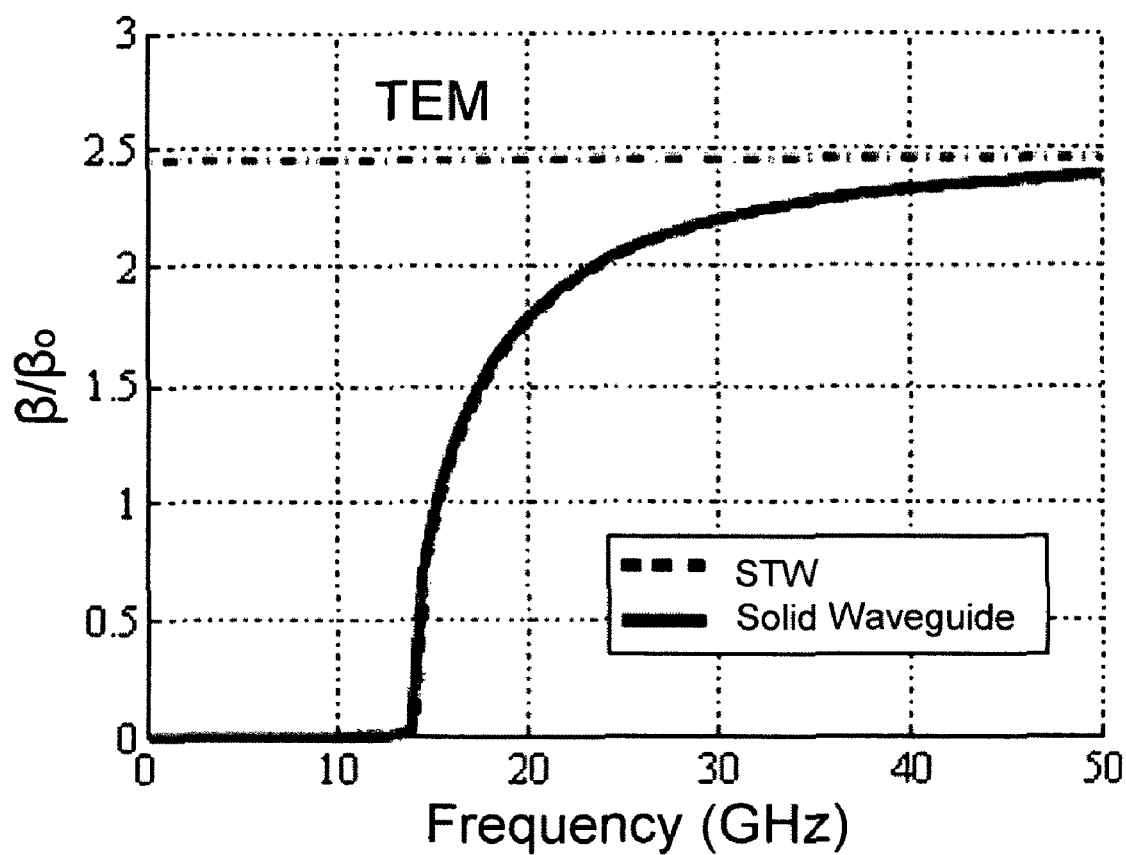
FIG. 8 is a diagram illustrating a normalized phase constant of the bandpass waveguide interconnect.

The bandpass data link system also comprises the dispersion compensation circuit 112 for compensating the known dispersion characteristic—or phase response—of the bandpass waveguide interconnect 106 determined, for example, using electromagnetic field analysis. FIG. 8 illustrates a phase response—normalized phase constant—of the bandpass waveguide interconnect 106 compared to an ideal TEM transmission. As illustrated in the diagram in FIG. 8, the phase constant is a nonlinear function of frequency, i.e. components of a transmitted data signal are affected differently depending on their frequency. The phase response is adjusted prior to transmission—pre-distortion—or, alternatively, after transmission of the bandpass data signal through the bandpass waveguide interconnect 106 using, for example, passive filters at the driver or at the receiver at the baseband level—before modulation—or the RF level—after modulation. Optionally, the passive filter is designed using modulated impedance or periodically loaded transmission lines to implement pulse chirping—chirp filter design. The passive filter is implemented, for example, as an all-pass microwave group-delay filter or phase filter in a, for example, Finite Impulse Response (FIR) filter design using analog or digital circuits. The analog implementation of the FIR filter comprises, for example, operational amplifiers or switched capacitor circuits. A series of digital FIR filters is used, for example, at the baseband level for pulse shaping. Alternatively, phase shifting circuits and phase filters are employed for the dispersion compensation. Further alternatively, pre-emphasis, pre-distorter and de-emphasis electronic circuits are employed for the dispersion compensation. Yet further alternatively, multiplexing/modulation techniques such as, for example, Orthogonal Frequency Division Multiplexing (OFDM), are adapted for performing dispersion compensation.

FIGS. 9a and 9b illustrate simplified block diagrams of an embodiment of an implementation of dispersion compensation in the system 100 for high-speed bandpass serial data communication for a single channel and a multi channel system, respectively.

Figure 10:
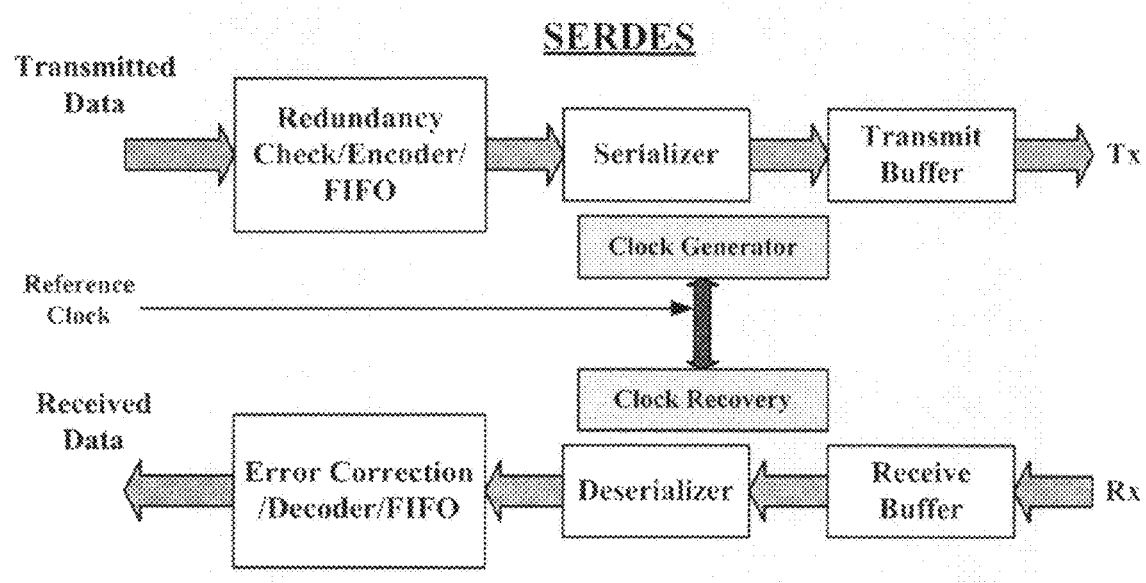
FIG. 10 is a simplified block diagram illustrating a SERializer DESerializer link for implementation in the system illustrated in FIG. 2.

In a serial transmission, a plurality of parallel data lines is serialized into a single high-speed data stream. Referring to FIG. 10, a simplified block diagram of a SERializer DESerializer (SERDES) link is shown. The SERDES link generally performs two functions. First, a serializer multiplies a reference clock frequency to a predetermined serial frequency and converts received parallel data signals to a serial data signal comprising the data from the parallel data signals. Second, after transmission the serial data signal is converted back to the original parallel data signals. A clock data recovery circuit extracts clock phase and frequency from the received serial data signal. The recovered clock frequency is a fraction of the frequency of the received serial data signal. For example, encoding/decoding techniques are employed for recovering the clock data to ensure a sufficient number of transitions present in the transmitted data signal in which the clock data are embedded. Examples of modulation processes for SERDES include NRZ, PAM4, and constant envelope modulations such as QPSK, DQPSK, and FSK. A benefit of higher order modulation is lower insertion loss at lower symbol rate. In amplitude modulation, there is a SNR penalty due to reduced swing between signal levels. For example, in PAM4, the penalty is around 20×log 10(1/3)=−9.5 dB resulting from an amplitude swing reduction by a factor of 3. This is avoidable using other modulation schemes such as QPSK. Bandpass implementations of QPSK transmission require a carrier frequency much higher than the data rate. Higher frequency carriers have other costs associated therewith but are extremely well suited to propagation in a SIW.

Alternatively, the SERDES link is replaced using OFDM modulator/demodulator blocks obinter-layer conductorting encoder and decoder blocks since the data recovery process is different. OFDM/QPSK implemented in the digital domain optionally maintains orthogonality. Optionally, encoder/decoder blocks are also employed. It is also possible to have systems containing both SERDES and OFDM blocks. OFDM is a digital multi-carrier modulation scheme, which utilizes a large number of closely-spaced orthogonal sub-carriers. OFDM signals are typically generated using a Fast Fourier Transform (FFT) process. Compared to single carrier techniques, each OFDM sub-carrier occupies only a small bandwidth, hence, the phase response for each channel is approximately a linear function of the frequency. Therefore, the dispersion compensation is facilitated. It is possible to modulate each sub-carrier using standard modulation techniques such as, for example, Quadrature Amplitude Modulation (QAM) to increase the data transmission rate without occupying additional bandwidth.

Optionally, duobinary modulation is used allowing for a lower frequency carrier signal to be utilized. Duobinary modulation is well understood in the art and only a very brief explanation is presented. In using duobinary modulation B bits are transmitted using less than B/2 Hz of bandwidth. This is performed by introducing intersymbol interference (ISI) into the signal in a controlled fashion such that its effects are later removable. There are several known methods for achieving this goal.

Figure 11:
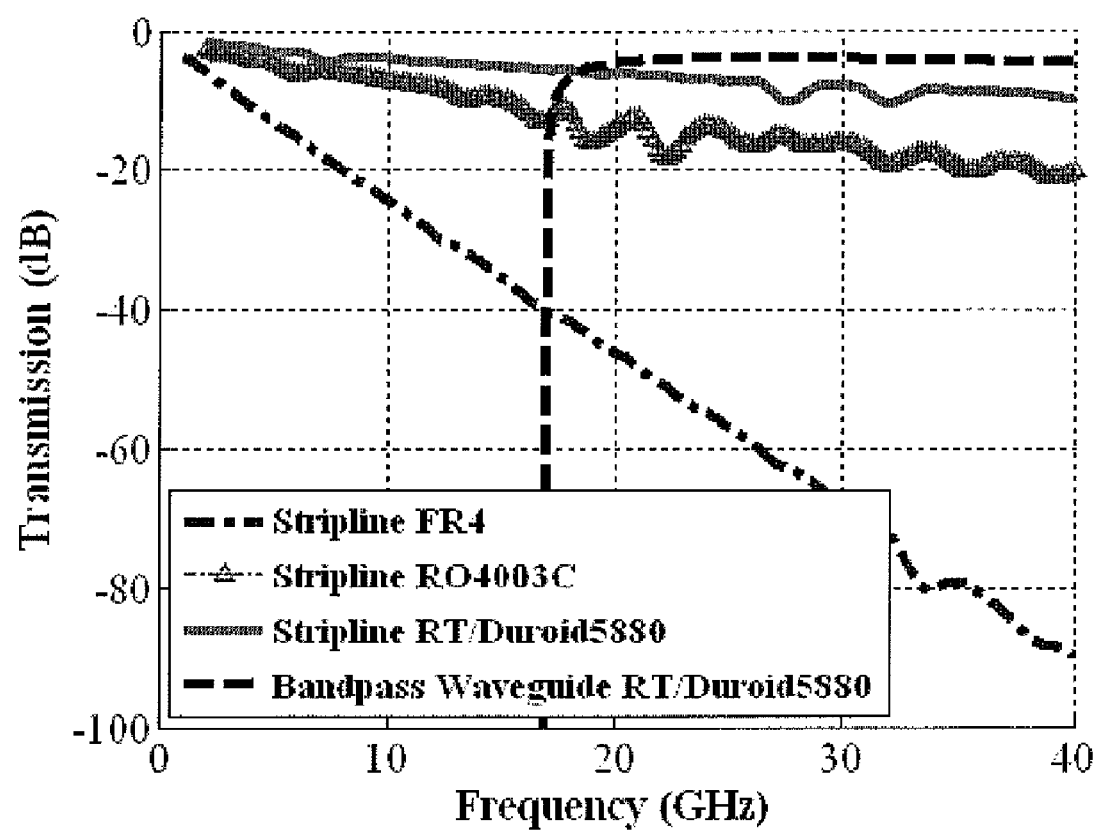
FIG. 11 is a diagram illustrating transmission characteristics for lowpass printed line interconnects and the bandpass waveguide interconnect.

The advantage of the system 100 is demonstrated in the comparison with conventional lowpass printed line interconnects shown in FIG. 11. FIG. 11 shows that high-frequency content traveling through an FR4™ suffers drastic attenuation, which is mainly attributed to the dielectric loss. Use of lowloss laminates such as Rogers RO4003C™ and RT/Duroid5880 provides a better transmission medium but at a substantially higher cost. In contrast employment of the bandpass waveguide interconnect 106 of the system 100 provides a better transmission characteristic than the stripline interconnect even when the same lowloss substrate is employed.

In many signaling scenarios there is no need for transmitting an entire pulse spectrum. For example, for distributing a clock signal only zero crossing points are often used. Often, an oscillator is used as a clock source in digital and mixed signal systems. To distribute the clock signal a low loss interconnect system with minimum crosstalk is beneficial. The system 100 efficiently and cost effectively supports these objectives in routing a single tone signal. The clock pulse is simply recovered inter-layer conductor frequency divider and trigger circuits.

Modern electronic systems are increasingly becoming very complex and condensed. The system 100 provides a new solution for ultrahigh-speed and wideband data transmission in such systems. As operating voltage decreases and systems become more compact, electronic circuits are more sensitive to noise and crosstalk. Therefore, the substantial immunity of the system 100 to these unwanted effects is highly advantageous. In addition, various techniques such as multiplexing, serializing and modulation enable increase of data transmission rates without adding more physical channels. Furthermore, multimode transmission provides another opportunity to increase the data transmission rate, as is described hereinbelow.

Figure 12A:
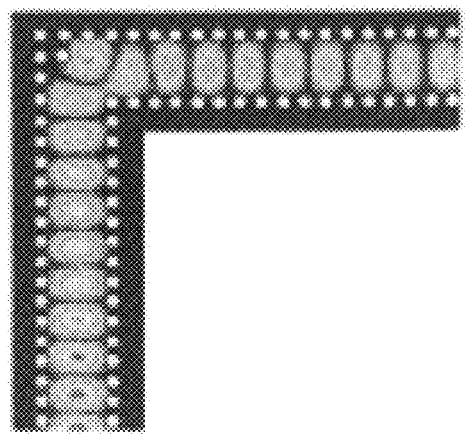
FIGS. 12a to 12c are top views of three bend structures of the bandpass waveguide interconnect according to the invention.
Figure 12B:
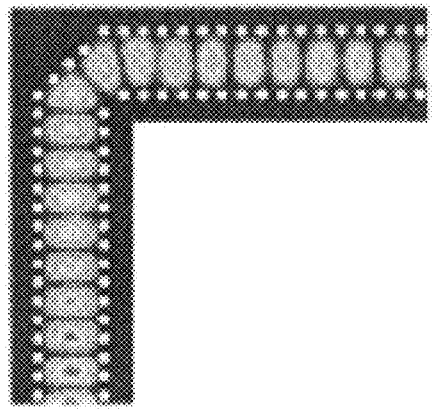
Figure 12C:
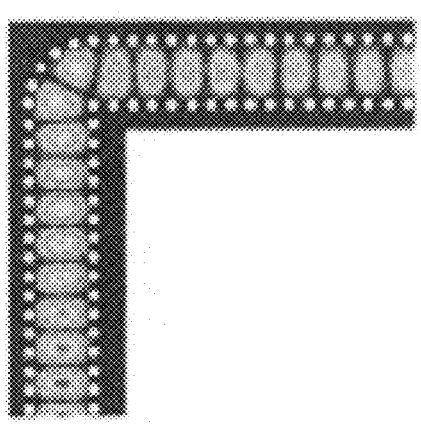

In many applications it is necessary to provide the bandpass waveguide interconnect 106 with bends. To alleinterlayer conductorte resulting reflections in the transmitted signal the width $W_g$ is optionally maintained substantially equal throughout the bend. For a sharp bend of approximately 90° three compensated bend structures are shown in FIGS. 12a to 12c. In the bend shown in FIG. 12a, a inter-layer conductor 212 is added at the right-angle corner of the left sidewall in order to reduce the width. In the bend shown in FIG. 12b, the left sidewall forms a chamfered bend and a inter-layer conductor is removed from the right-angle corner of the right sidewall. In the bend shown in FIG. 12c the left sidewall forms a rounded corner. Simulations showed that all three bend designs are very effective in transmitting signals around bends with minimum loss.

Figure 13:
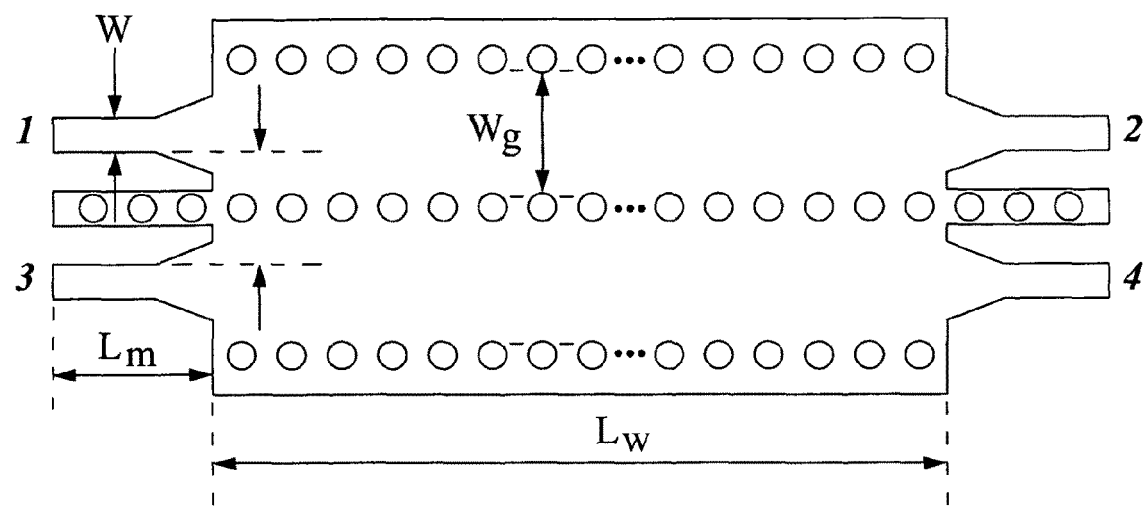
FIG. 13 is a top view of a multiple bandpass waveguide interconnect with co-planar transition sections according to the invention.

Referring to FIG. 13, a multiple bandpass waveguide interconnect with co-planar transition sections is shown. Simulations have shown that it is possible to design multiple bandpass waveguide interconnects separated by a row of inter-layer conductors having substantially less crosstalk than the crosstalk between microstrips with a same total width. Proper design of the transition sections and, optionally, inter-layer conductor fences therebetween, enables provision of multiple bandpass waveguide interconnects as described in more detail in Appendix C.

Using a flexible dielectric substrate such as, or example, a flex-board type substrate—it is possible to provide the bandpass waveguide interconnect as a connecting cable. The bandpass waveguide interconnect comprises a first and a second flexible conducting layer disposed on a top surface and a bottom surface of the strip of a flexible dielectric substrate, respectively. A first and a second row of conducting inter-layer conductors connect the first and the second conducting layer. The second row of conducting inter-layer conductors is disposed at a predetermined distance and oriented substantially parallel to the first row of conducting inter-layer conductors along the strip of a flexible dielectric substrate. Co-planar transition sections, as illustrated above, are used to launch to and to extract the signals from the bandpass waveguide interconnect. For example, micro-striplines are used to transmit the signals between the transition sections and respective connectors on both ends of the cable. For protection, the bandpass waveguide interconnect, the transition sections and the micro-striplines are enclosed in a protecting and insulating cover.

Figure 14A:
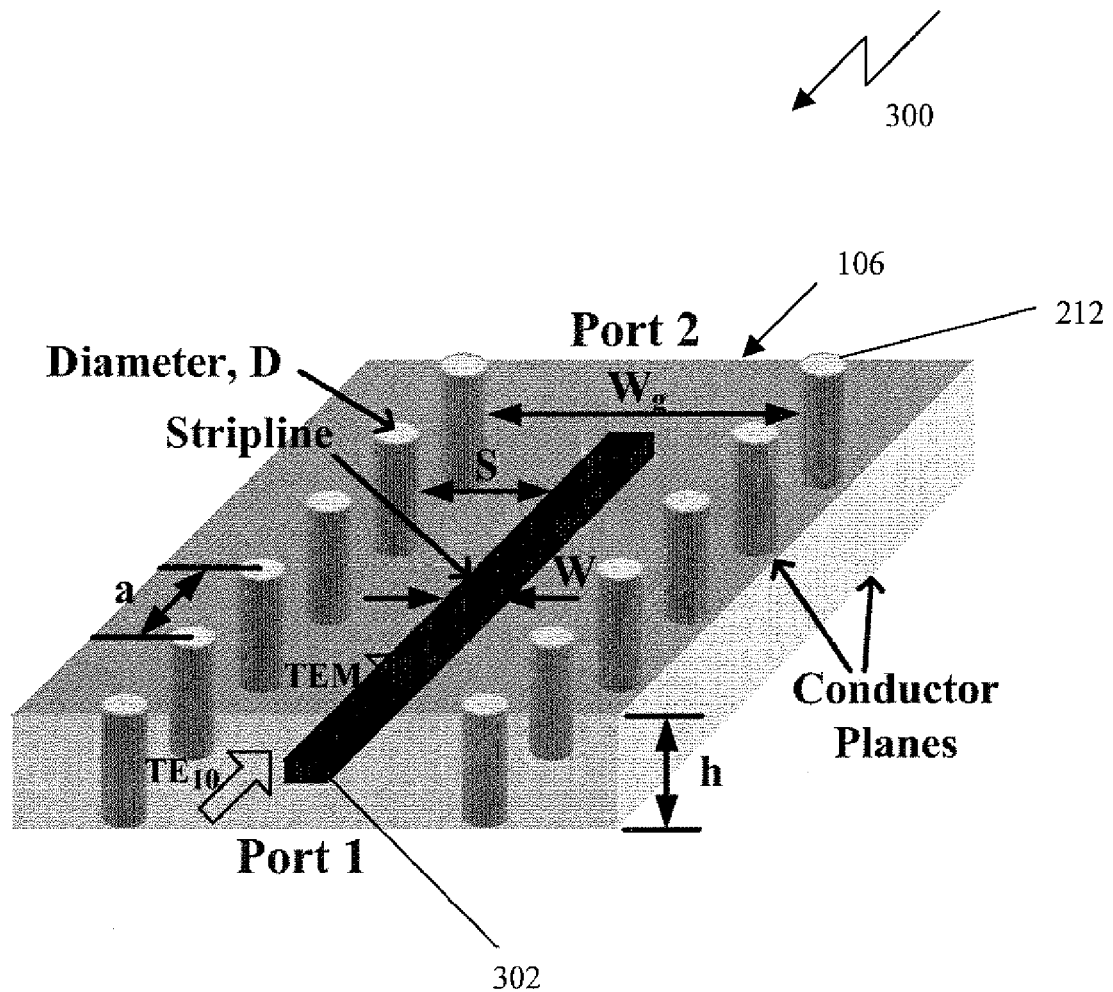
FIGS. 14a and 14b are perspective views of hybrid bandpass waveguide interconnects according to the invention.
Figure 14B:
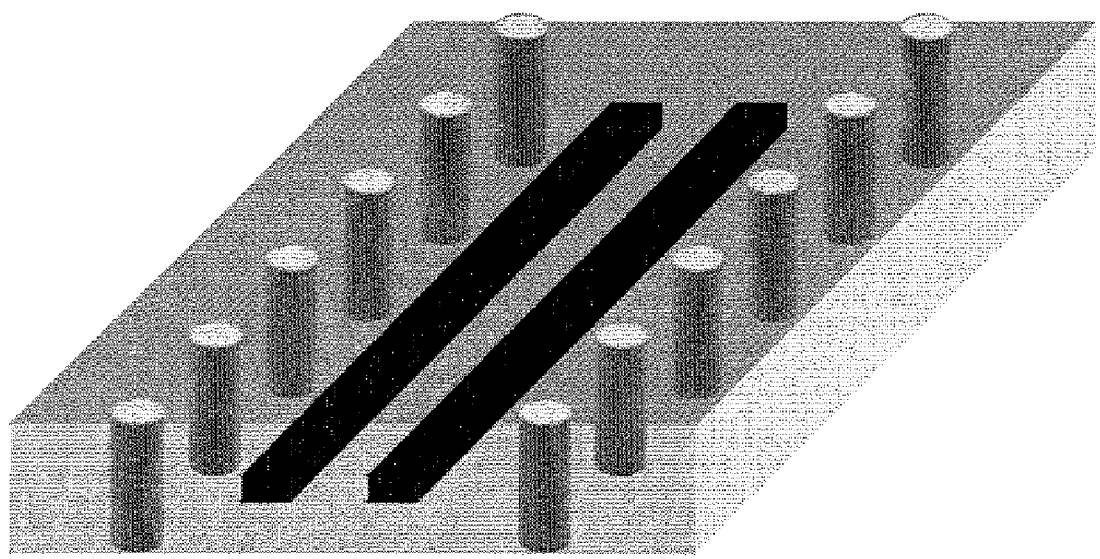
Figure 14C:
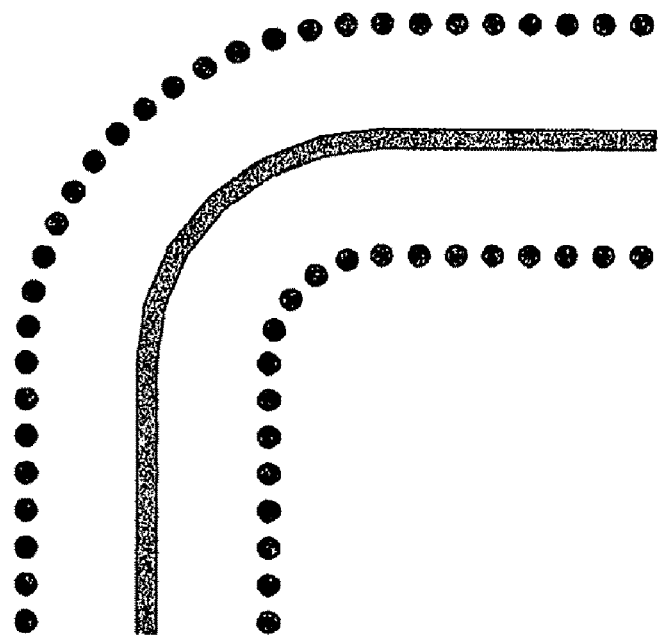
FIGS. 14c and 14d are top views of bend structures of the hybrid bandpass waveguide interconnects shown in FIGS. 14a and 14b, respectively, according to the invention.
Figure 14D:
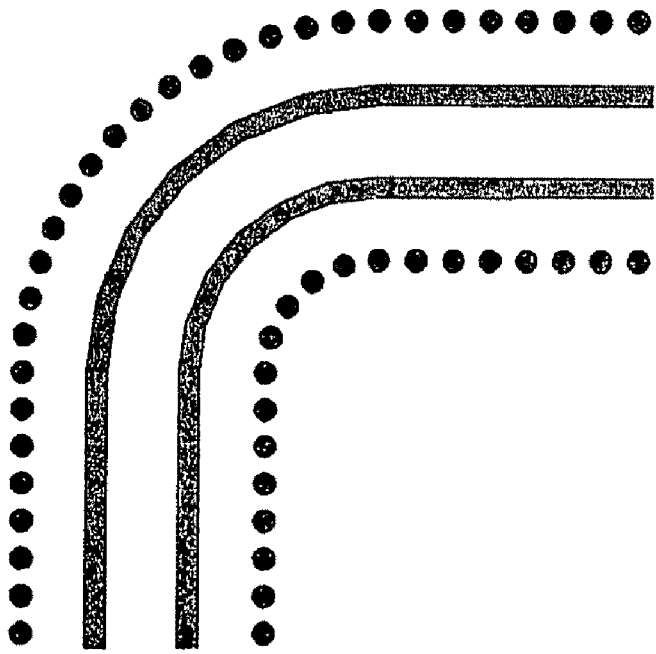

Referring to FIG. 14a, a hybrid bandpass waveguide interconnect 300 according to an embodiment of the invention is shown. Same reference numbers are used for same components of the waveguide as the one shown in FIG. 4. The hybrid bandpass waveguide interconnect 300 comprises the bandpass waveguide interconnect 106 and a stripline 302 embedded therein. To reduce interactions between the stripline and the rows of inter-layer conductors 212, the spacing S between the inter-layer conductors 212 and the stripline is preferably chosen to satisfy the condition S/h>1. The dual interconnect structure has a unique characteristic in that it enables simultaneous signal transmission along the stripline 302 and the waveguide 106. The stripline 302 is a lowpass transmission line with TEM as its dominant mode. In contrast, the fundamental transmission mode in the waveguide 106 is $TE_{10}$, which implies a bandpass characteristic. Here, a multi-mode transmission technique is employed ensuring efficient transmission of uncorrelated modes in a same space. Therefore, the waveguide volume is reused and the overall data transmission rate is substantially increased. Of course, it is possible to embed more than one stripline 302 in the waveguide to further increase the data transmission rate, as illustrated in FIG. 14b. It is also possible to provide the hybrid bandpass waveguide interconnects shown in FIGS. 14a and 14b with bends, as illustrated in FIGS. 14c and 14d, respectively.

Figure 15A:
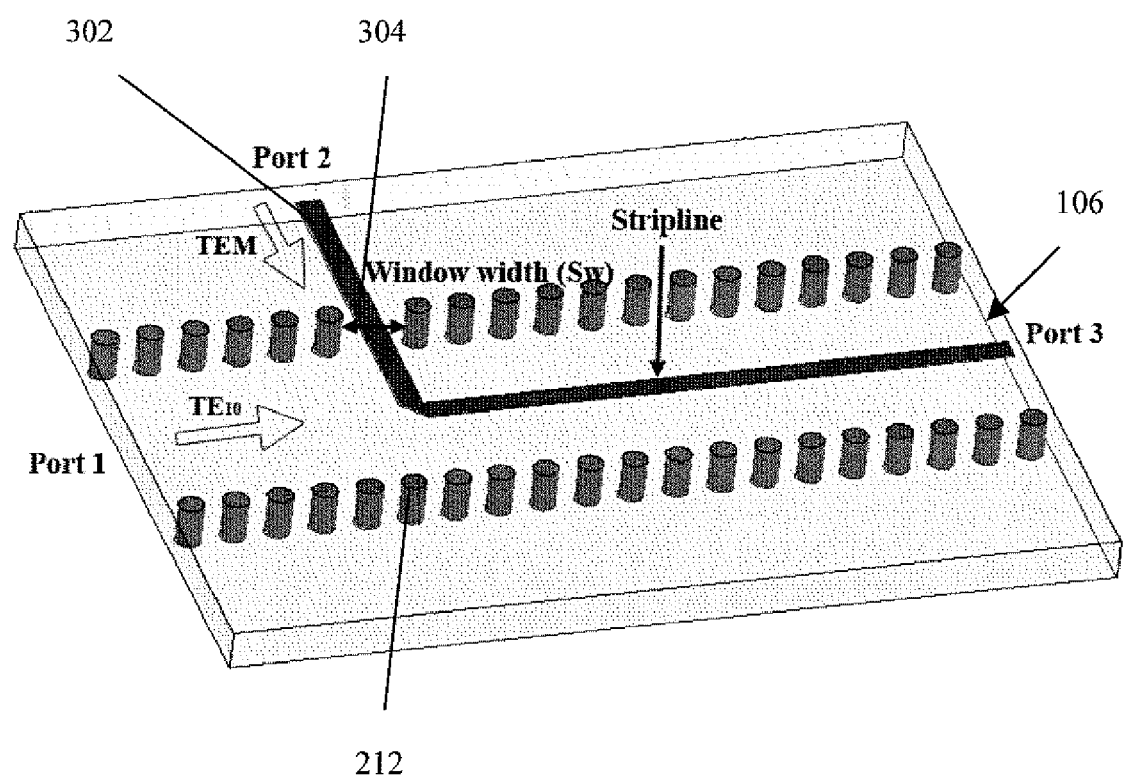
FIGS. 15a and 15b are a perspective view and a top view, respectively, illustrating entry and exit of a stripline to and from the hybrid bandpass waveguide interconnects according to the invention.
Figure 15B:
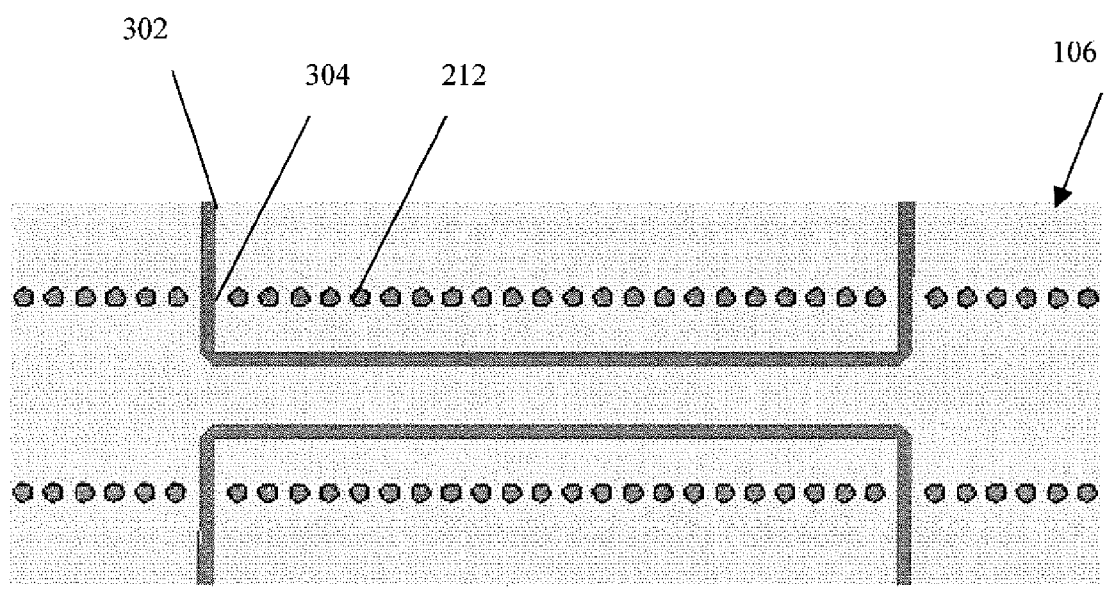

Referring to FIGS. 15a and 15b, entry and exit of the stripline 302 into and from the bandpass waveguide interconnect 106 are shown. To launch the bandpass data signal, for example, co-planar micro-strip to waveguide transitions 214 are chosen. The stripline 302 is routed into or out of the bandpass waveguide interconnect 106 at the end—port 3—of the bandpass waveguide interconnect 106, as shown in FIG. 15a. Alternatively, side-entry transitions are provided through windows 304 of width ($S_w$), as shown in FIGS. 15a and 15b. The windows 304 are preferably designed to create a matching condition or approximately minimum loading due to the discontinuity in the signal transmission through the stripline 302, i.e. the power loss due to reflection at the entry point is minimized. Further, the windows 304 are preferably designed to approximately minimize the leakage of the transmitted bandpass data signal through the waveguide 106. Of course, there are various different implementations possible such as, for example, provision of side entries for more than one stripline on a same side of the waveguide 106; entry of the stripline through one side of the waveguide and exit through the opposite side; and provision of a plurality of striplines placed in different sections along the waveguide.

Figure 16A:
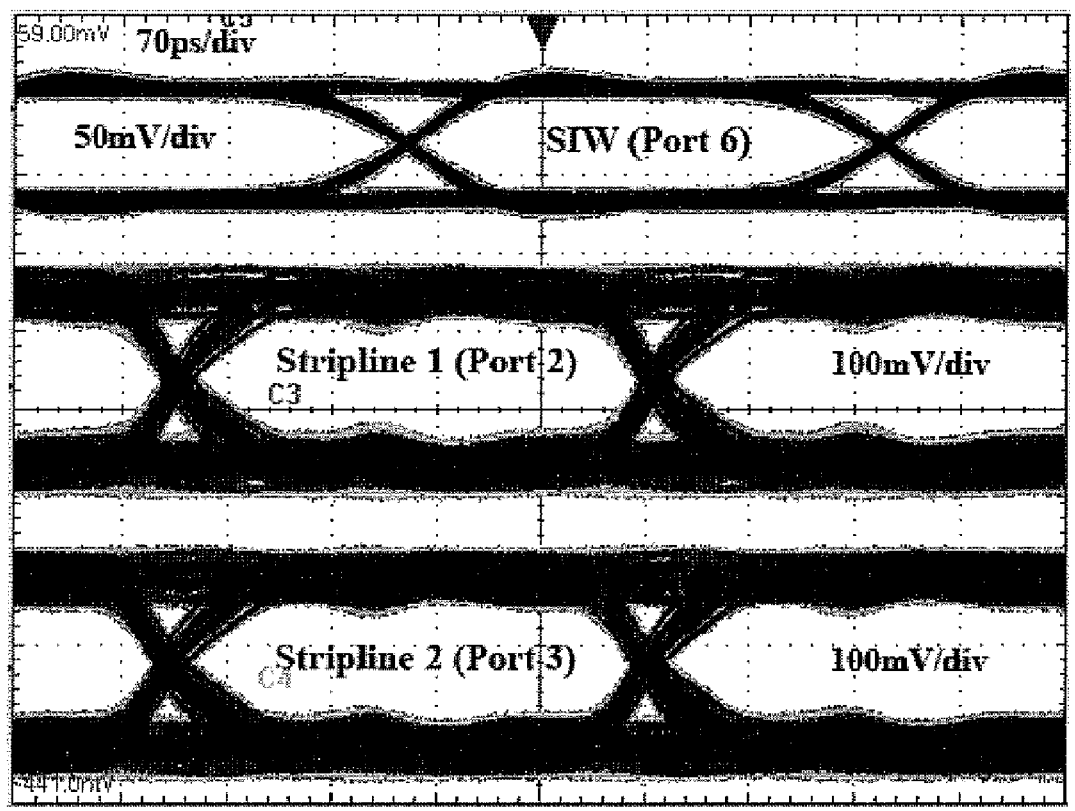
FIGS. 16a and 16b illustrate eye diagrams of the hybrid bandpass waveguide interconnect.
Figure 16B:
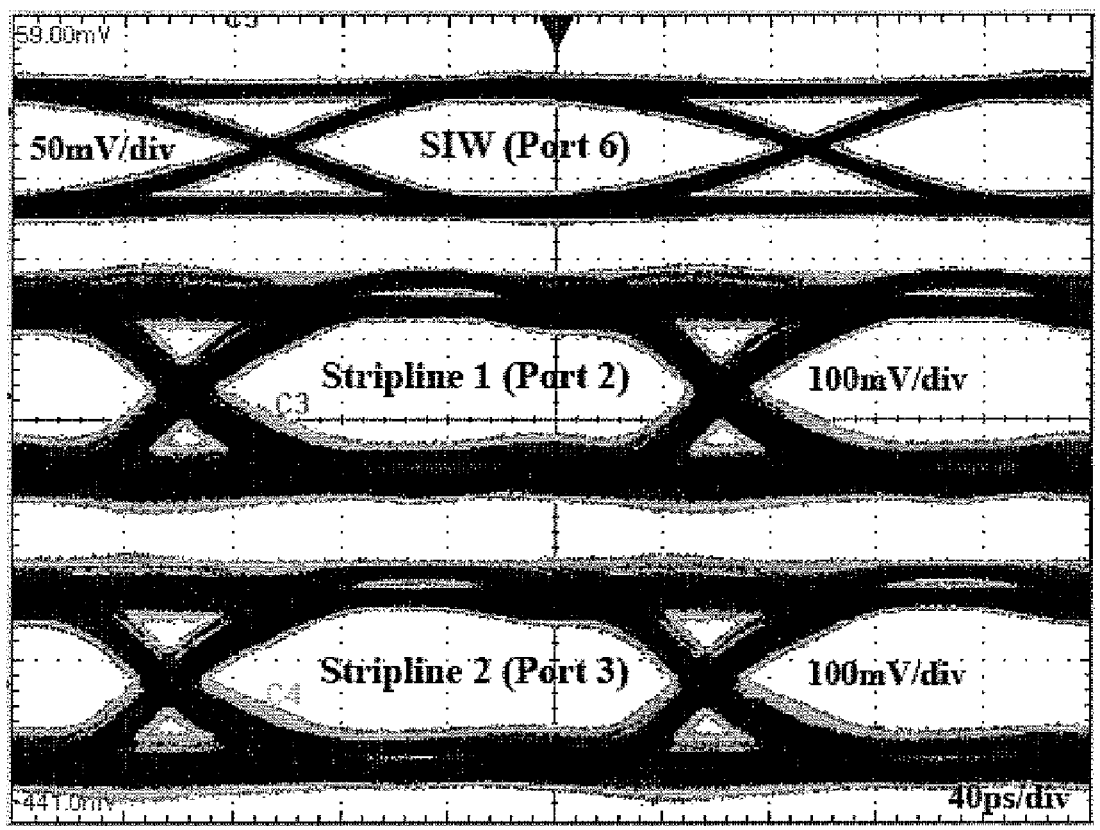

A 48 mm long hybrid bandpass waveguide interconnect has been fabricated on a Rogers 4003C™ substrate. The side-entry transition has been used to route two striplines in and out of the waveguide. The system described above has been used for the high speed data transmission in the waveguide. Baseband signals have been fed directly to the embedded striplines. Data rates of 3.125 Gb/s and 5 Gb/s have been used to evaluate the performance of the hybrid bandpass waveguide interconnect system. Test results, illustrated in FIGS. 16a and 16b, show excellent eye openings in the waveguide transmission. The eye amplitudes are less than those of the stripline output signal eyes due to 6 dB conversion loss in each mixer. The quality of the stripline output signal eyes is affected by the resistive power divider used to obtain two separate input signals. The test has demonstrated that the hybrid bandpass waveguide interconnect was able to more than triple the data transmission rate of a single waveguide. Specifically, a maximum aggregate data transmission rate of 15 Gb/s has been achieved. The hybrid bandpass waveguide interconnect according to the invention enables approximately Electro Magnetic Interference (EMI)—free high-speed point-to-point communication. More information regarding the hybrid bandpass waveguide interconnect is disclosed in Appendix E.

Figure 17A:
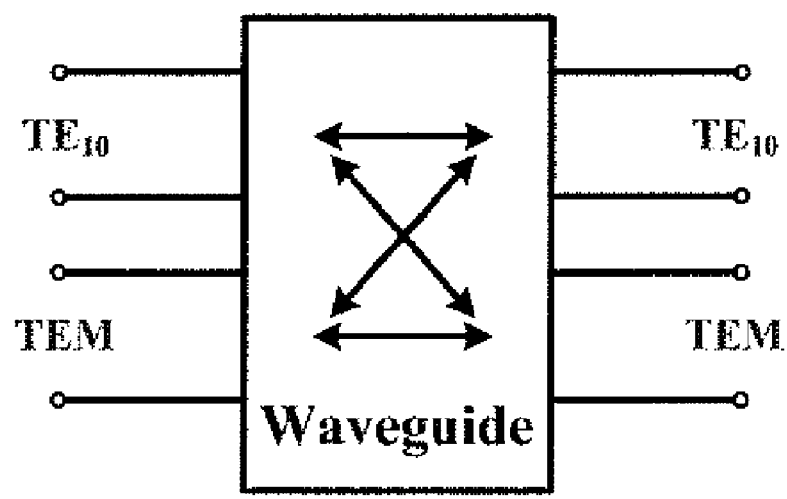
FIGS. 17a and 17b are simplified diagrams conceptually representing multimode transmission.

The hybrid bandpass waveguide interconnect 300 is a multimode transmission channel. The multimode transmission comprises the $TE_{10}$ transmission mode through the—bandpass—waveguide and the TEM transmission mode through the—lowpass—stripline, as conceptually represented in FIG. 17a.

Figure 17B:
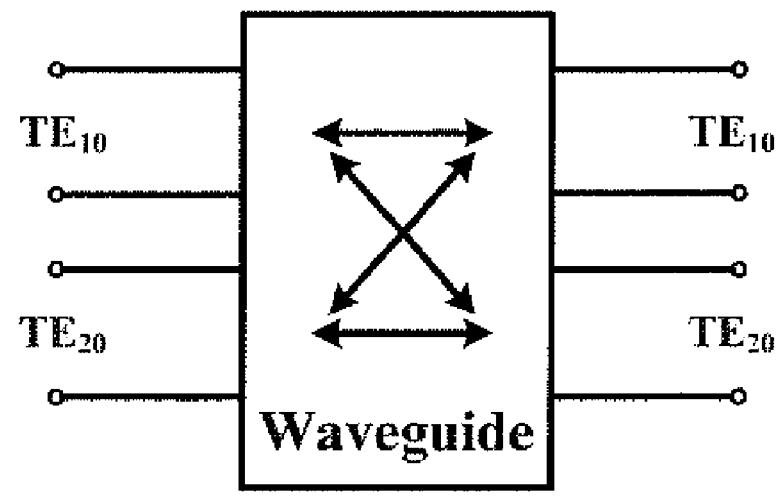

An alternative multimode solution for maximizing usage of the bandpass waveguide interconnect is conceptually illustrated in FIG. 17b. It is possible to use a plurality of different $TE_{m0}$ transmission modes for transmitting different data signals through a single bandpass waveguide interconnect depending on the frequency band. For example, the $TE_{10}$ and $TE_{20}$ transmission modes are used for simultaneously transmitting two different data signals through the bandpass waveguide interconnect, as shown in FIG. 17b. Therefore, the waveguide aggregate bandwidth is increased. Further optionally, more than two modes are transmitted inter-layer conductor a same waveguide interconnect simultaneously.

Figure 18A:
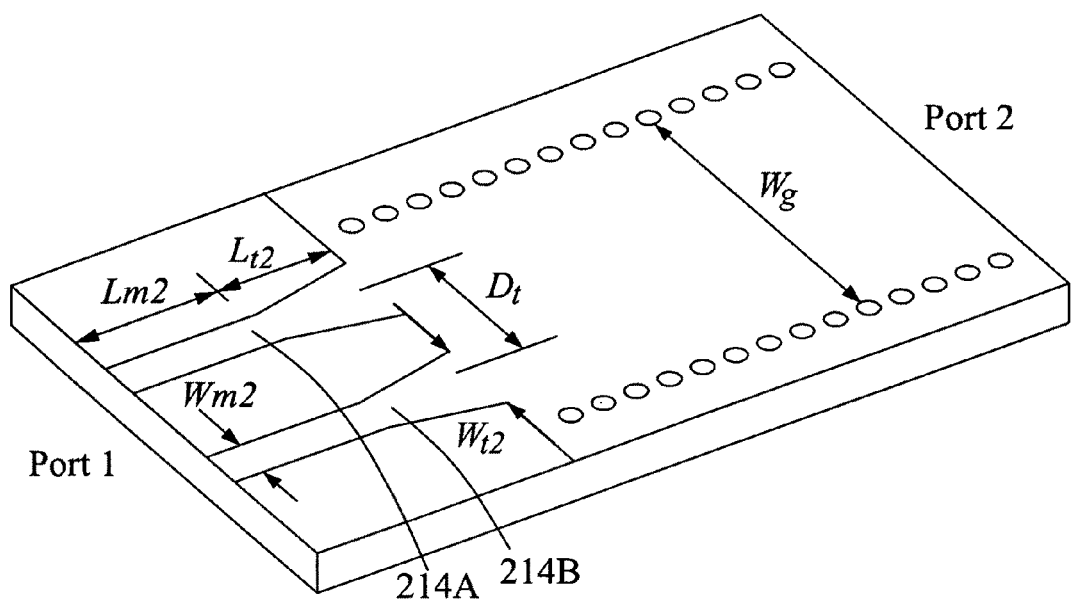
FIGS. 18a and 18b are a top view and a perspective view, respectively, illustrating transitions for launching multimode transmission into the bandpass waveguide interconnect according to the invention.
Figure 18A:
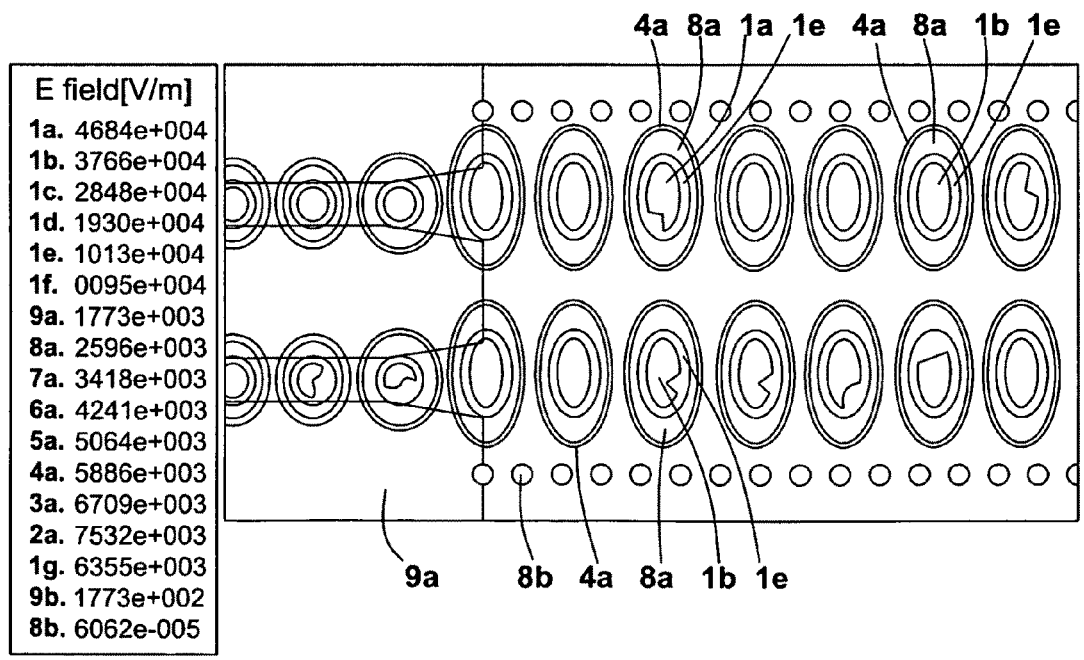
Figure 18B:
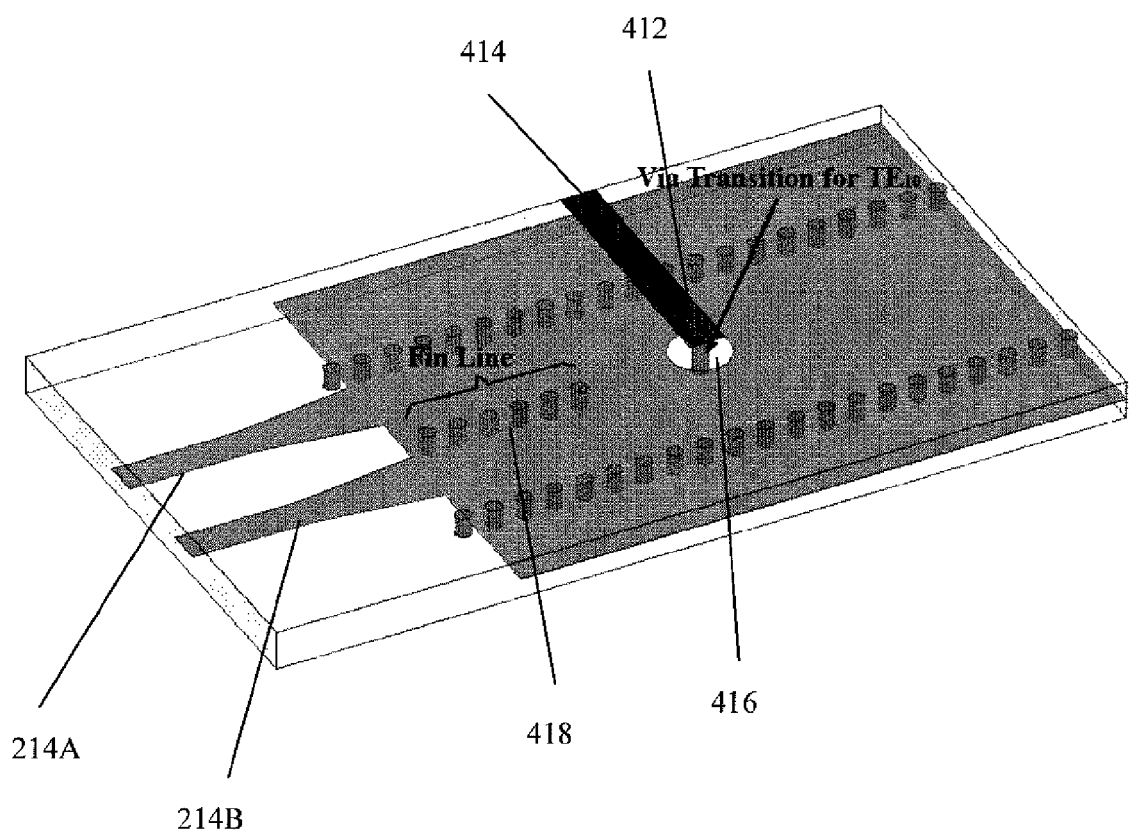

The $TE_{20}$ transmission mode is launched using, for example, two coplanar microstrip-to-waveguide transitions 214A and 214B, as shown in FIG. 18a. Simulation results have shown that this type of transition is efficient for launching the $TE_{20}$ transmission mode. Referring to FIG. 18b, transitions are shown for simultaneously launching the $TE_{10}$ and $TE_{20}$ transmission modes using the transitions 214A and 214B for launching the $TE_{20}$ transmission mode and a inter-layer conductor 412 connected to a microstrip-line 414 and placed in the center of the bandpass waveguide through an opening 416 in the conductive layer of the bandpass waveguide. Optionally, a fin line 418 of inter-layer conductors is disposed at the center of an entry portion of the bandpass waveguide to prevent the $TE_{10}$ transmission mode from propagating into the transition of the $TE_{20}$ transmission mode. Also, the fin line 418 can act to prevent excitation of $TE_{10}$ mode at the differential port provided for the excitation $TE_{20}$ mode.

Figure 18C:
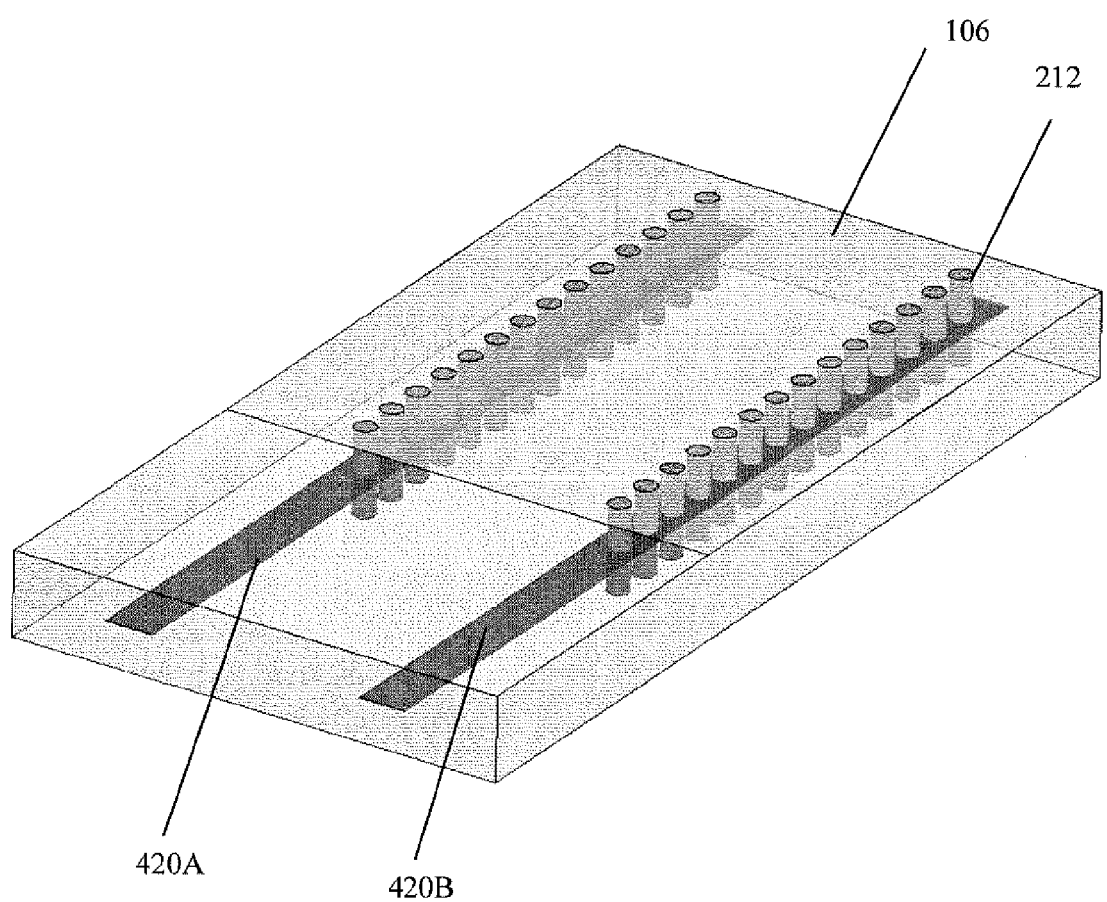
FIG. 18c is a top view illustrating transitions for launching TM and $TE_{0n}$ ($n \neq 0$) transmission modes into the bandpass waveguide interconnect.

Furthermore, it is also possible to launch signals in the TM and $TE_{0n}$ (n≠0) transmission modes into the bandpass waveguide. As shown in FIG. 18c, the signal is provided to two strips 420A and 420B connecting the inter-layer conductors 212 on the sidewalls of the waveguide 106. The extension of the connecting strips 420A and 420B serves as a transition structure for launching signals in the TM and $TE_{0n}$ (n≠0) transmission modes into the bandpass waveguide 106.

Figure 19:
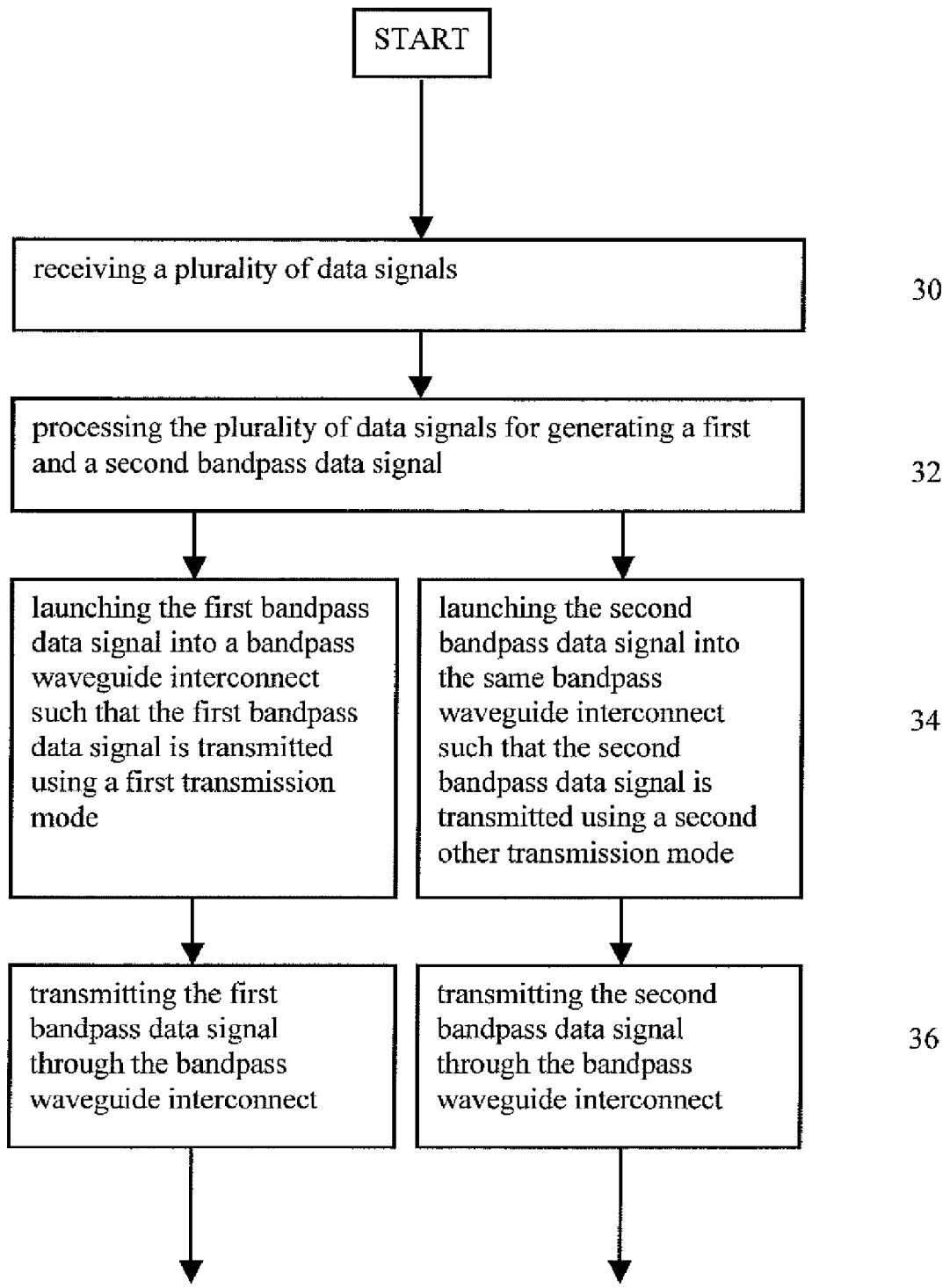
FIG. 19 is a simplified flow diagram of a method for multimode high-speed bandpass serial data communication according to the invention.
Figure 19:
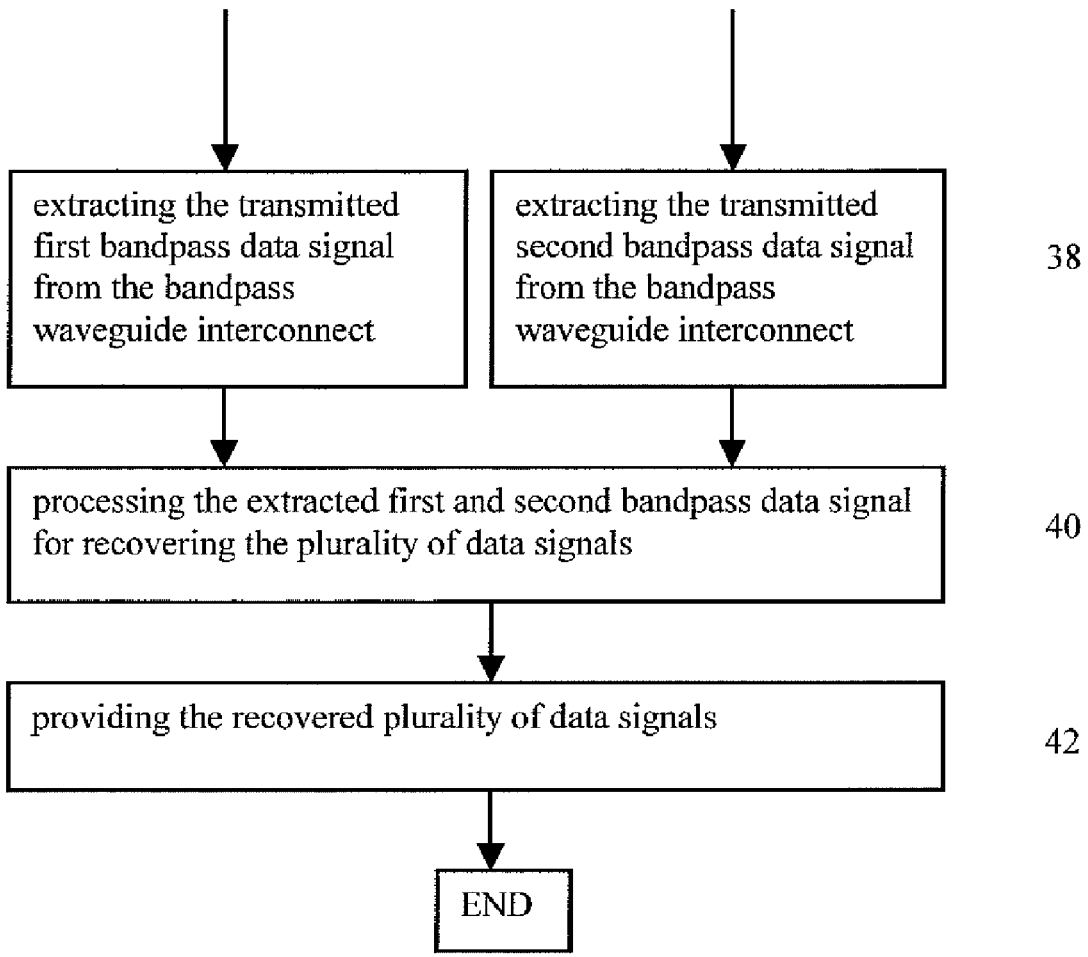

Referring to FIG. 19, a simplified flow diagram of a method for multimode high-speed bandpass serial data communication according to the invention is shown. At 30, a plurality of data signals is received and then processed—at 32—for generating a first and a second bandpass data signal within a predetermined first and second frequency band, respectively. The processing is performed, for example, using the system and methods disclosed hereinabove. At 34, the first bandpass data signal and the second bandpass data signal are simultaneously launched into the same bandpass waveguide interconnect 106 using, for example, the transitions shown in FIG. 18b for exciting the $TE_{10}$ and $TE_{20}$ transmission modes. After simultaneous transmission through the bandpass waveguide interconnect 106—at 36, the first bandpass data signal and the second bandpass data signal are—at 38—extracted from the bandpass waveguide interconnect 106 using respective transitions. At 40, the extracted first and second bandpass data signal are processed for recovering the plurality of data signals, for example, using the system and methods disclosed hereinabove, and—at 42—provided for further processing.

Figure 20:
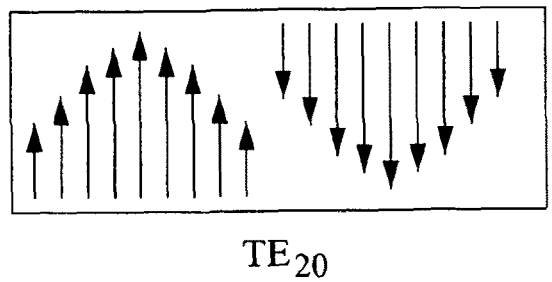
FIG. 20 is a simplified field diagram for a field for providing a $TE_{20}$ wave within a waveguide; and, FIG. 21 is a simplified diagram of a waveguide having a feed for providing a exciting a $TE_{20}$ wave using two signals applied to opposite planes.
Figure 21:
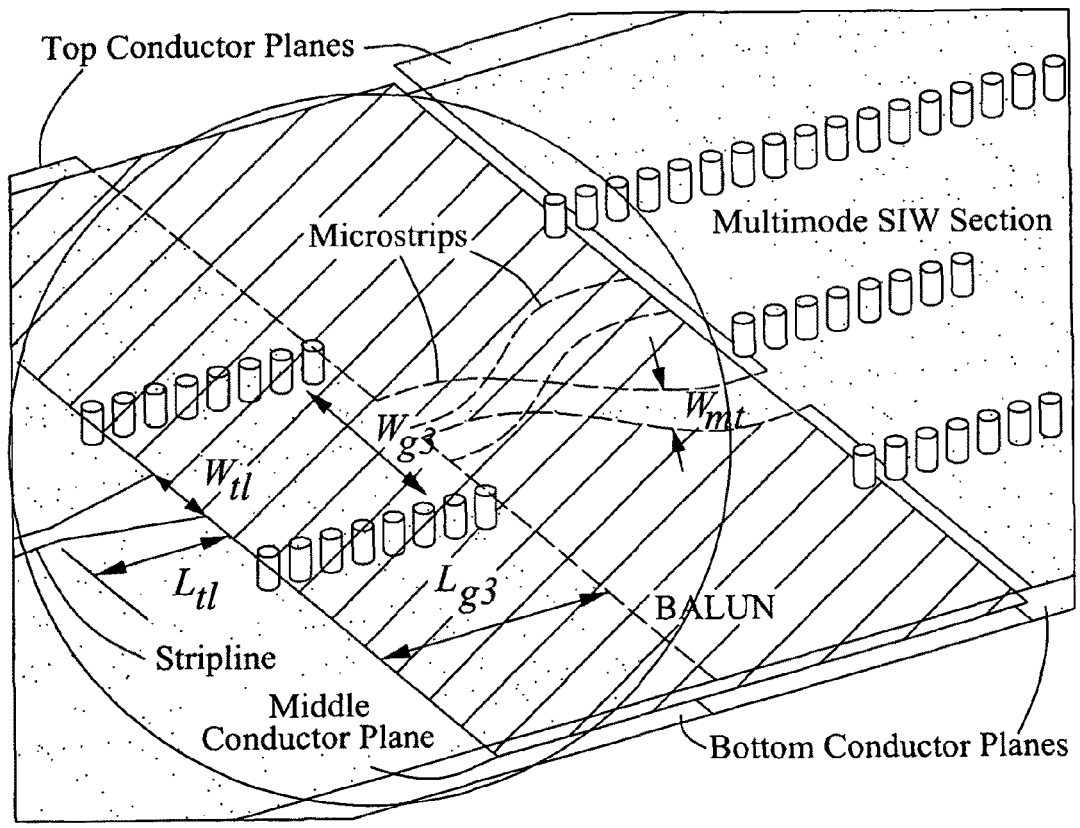

In order to excite the $TE_{20}$ mode, the field profile shown in FIG. 20 should be generated. For example, two coplanar microstrip-to-waveguide transitions are used to generate two out-of-phase field vectors at the waveguide input port, as illustrated in FIG. 18a. Alternatively the coplanar transitions are placed on the opposite planes when both transition sections are carrying in-phase signals. A structure for implementing this technique is shown in FIG. 21.

Preferably, when using the $TE_{10}$ and $TE_{20}$ modes in a same waveguide, the signals are filtered for preventing receiving interference and noise outside of a band of interest for each.

Though a common form of inter-layer conductors is a through-hole conductor, for example a via, the term is intended to encompass a broader range of inter-layer conductors as are now manufacturable including rectangular vias and layers of conductive material disposed normal to the layers of a substrate. Further, the term encompasses through hole conductors and hidden or partially hidden conductors.

Though the waveguides described hereinabove are substrate integrated waveguides formed on substrates such as printed circuit boards, they are also applicable to integrated circuit implementations such as an Si implementation within a chip. Further, they are also applicable for implementation on flexible substrates or within flexible material disposed on a removable substrate for forming flexible waveguide interconnects or cables.

Numerous other embodiments of the invention will be apparent to persons skilled in the art without departing from the spirit and scope of the invention as defined in the appended claims.

What is claimed is:

1. An apparatus comprising:
a first port for receiving an input data signal comprising first data;
a bandpass waveguide interconnect having a phase response and for supporting propagation of a bandpass data signal within a predetermined frequency band along a predetermined path between a first location and a second location;
a first adaptor coupled to the bandpass waveguide interconnect for exciting an input bandpass data signal comprising the first data in the bandpass waveguide interconnect proximate the first location and propagating toward the second location;
a second adaptor coupled to the bandpass waveguide interconnect for extracting an output bandpass data signal from the bandpass waveguide interconnect proximate the second location; and
a dispersion compensator for providing dispersion compensation to at least one of the input bandpass data signal and the output bandpass data signal for compensating for the phase response of the bandpass waveguide interconnect.

2. An apparatus according to claim 1 comprising:
a driver for receiving the input data signal and for generating a first signal for exciting the input bandpass data signal in dependence thereupon; and
a receiver coupled to the second adaptor for recovering the input data signal from the output bandpass data signal, wherein a dispersion compensation circuit forms part of at least one of the driver and the receiver.

3. An apparatus according to claim 2 wherein the driver comprises at least one of a serializer for serializing a plurality of received parallel data signals and a multiplexer for multiplexing a plurality of received parallel data signals, and wherein the receiver comprises at least one of a de-serializer for de-serializing the an extracted baseband data signal and a de-multiplexer for de-multiplexing the extracted baseband data signal.

4. An apparatus according to claim 1 wherein the dispersion compensator comprises a passive filter.

5. An apparatus according to claim 4 wherein the dispersion compensator comprises one of a group-delay filter and a phase filter.

6. An apparatus according to claim 1 wherein the dispersion compensator comprises a variation in an H-plane width of a portion of the bandpass waveguide interconnect for affecting dispersion thereof.

7. An apparatus according to claim 1 wherein the dispersion compensator comprises at least an optical component disposed for approximately equalizing dispersion of the bandpass waveguide interconnect.

8. An apparatus according to claim 1 wherein the bandpass waveguide interconnect comprises:
first and a second conducting layers disposed on opposing sides of a dielectric substrate;
a first set of inter-layer conductors connecting the first and the second conducting layers, the first set disposed along a first path; and,
a second set of inter-layer conductors disposed along a second path spaced apart from the first path and forming a bounded region having a cross section defined by the first and second conducting layers on two sides and by the first and second set of inter-layer conductors on two other sides thereof.

9. An apparatus comprising:
a first port for receiving an input data signal comprising first data;
a bandpass waveguide interconnect having a phase response and for supporting propagation of a bandpass data signal within a predetermined frequency band along a predetermined path between a first location and a second location;
a first adaptor coupled to the bandpass waveguide interconnect for exciting an input bandpass data signal comprising the first data in the bandpass waveguide interconnect proximate the first location and propagating toward the second location;
a second adaptor coupled to the bandpass waveguide interconnect for extracting an output bandpass data signal from the bandpass waveguide interconnect proximate the second location;
first and a second conducting layers disposed on opposing sides of a dielectric substrate;
a first set of inter-layer conductors connecting the first and the second conducting layers, the first set disposed along a first path; and,
a second set of inter-layer conductors disposed along a second path spaced apart from the first path and forming a bounded region having a cross section defined by the first and second conducting layers on two sides and by the first and second set of inter-layer conductors on two other sides thereof, wherein the first path and the second path are separated by an approximately uniform distance along a length thereof.

10. An apparatus according to claim 9 wherein the first path and the second path other than follow a straight line.

11. An apparatus according to claim 10 wherein the first path and the second path each comprise a bend of approximately 90 degrees.

12. An apparatus according to claim 11 wherein the first set of inter-layer conductors forming an outside right-angle corner has an additional inter-layer conductor disposed therein inside the right angle corner thereof and the second set of inter-layer conductors has a substantially right-angle corner facing the outside right-angle corner.

13. An apparatus according to claim 11 wherein the first set of inter-layer conductors forms a chamfered bend and the second set of inter-layer conductors forms a right-angle corner, and absent an inter-layer conductor of the second set of inter-layer conductors being disposed at the right-angle corner.

14. An apparatus according to claim 11 wherein the first set of inter-layer conductors forms a curved path and the second set of inter-layer conductors forms an approximately right-angle corner.

15. An apparatus according to claim 9 comprising:
a second bandpass waveguide interconnect for having a second data signal propagating therein along a predetermined path within the dielectric substrate, the second bandpass waveguide interconnect comprising:
the first and a second conducting layers; and,
a third set of inter-layer conductors connecting the first and the second conducting layers, the third set of inter-layer conductors disposed for forming the second bandpass waveguide between the third set of inter-layer conductors and the second set of inter-layer conductors.

16. An apparatus according to claim 15 comprising:
a third bandpass waveguide interconnect for having a third data signal propagating therein along a predetermined path within the dielectric substrate, the third bandpass waveguide interconnect comprising:
the first and a second conducting layers; and,
a fourth set of inter-layer conductors connecting the first and the second conducting layers, the fourth set of inter-layer conductors disposed for forming the third bandpass waveguide between the third set of inter-layer conductors and the fourth set of inter-layer conductors.

17. An apparatus comprising:
a first port for receiving an input data signal comprising first data;
a bandpass waveguide interconnect having a phase response and for supporting propagation of a bandpass data signal within a predetermined frequency band along a predetermined path between a first location and a second location;
a first adaptor coupled to the bandpass waveguide interconnect for exciting an input bandpass data signal comprising the first data in the bandpass waveguide interconnect proximate the first location and propagating toward the second location;
a second adaptor coupled to the bandpass waveguide interconnect for extracting an output bandpass data signal from the bandpass waveguide interconnect proximate the second location; and
a strip of a conductive material having a predetermined width for conducting the input bandpass data signal, the strip of conductive material disposed along at least a portion of the predetermined path within the waveguide interconnect between a location proximate the first location and a location proximate the second location.

18. An apparatus comprising:
a first port for receiving an input data signal comprising first data;
a bandpass waveguide interconnect having a phase response and for supporting propagation of a bandpass data signal within a predetermined frequency band along a predetermined path between a first location and a second location;
a first adaptor coupled to the bandpass waveguide interconnect for exciting an input bandpass data signal comprising the first data in the bandpass waveguide interconnect proximate the first location and propagating toward the second location;
a second adaptor coupled to the bandpass waveguide interconnect for extracting an output bandpass data signal from the bandpass waveguide interconnect proximate the second location;

first and a second conducting layers disposed on opposing sides of a dielectric substrate;
a first set of inter-layer conductors connecting the first and the second conducting layers, the first set disposed along a first path;
a second set of inter-layer conductors disposed along a second path spaced apart from the first path and forming a bounded region having a cross section defined by the first and second conducting layers on two sides and by the first and second set of inter-layer conductors on two other sides thereof; and,
a strip of a conductive material having a predetermined width for conducting the bandpass data signal, the strip of conductive material disposed along at least a portion of the predetermined path within the waveguide interconnect between the first and second sets of inter-layer conductors wherein the strip of a the conductive material is routed into the bandpass waveguide interconnect through a gap in the first set of inter-layer conductors.

19. An apparatus comprising: a first port for receiving an input data signal comprising first data; a bandpass waveguide interconnect having a phase response and for supporting propagation of a bandpass data signal within a predetermined frequency band along a predetermined path between a first location and a second location, a first adaptor coupled to the bandpass waveguide interconnect for exciting an input bandpass data signal comprising the first data in the bandpass waveguide interconnect proximate the first location and propagating toward the second location; a second adaptor coupled to the bandpass waveguide interconnect for extracting an output bandpass data signal from the bandpass waveguide interconnect proximate the second location; and a dielectric substrate comprising a flexible material forming a flexible dielectric substrate and the bandpass waveguide interconnect comprising a first and a second flexible conducting layer disposed on a top surface and a bottom surface of a strip of the flexible dielectric substrate such that the bandpass waveguide interconnect is flexible.

20. An apparatus according to claim 19 comprising a plurality of bandpass waveguide interconnects disposed parallel to one another within the same flexible dielectric substrate forming a flexible ribbon.

21. An apparatus comprising:
a first port for receiving an input data signal comprising first data;
a bandpass waveguide interconnect having a phase response and for supporting propagation of a bandpass data signal within a predetermined frequency band along a predetermined path between a first location and a second location, the bandpass waveguide interconnect comprising a substrate waveguide interconnect;
a first adaptor coupled to the bandpass waveguide interconnect for exciting an input bandpass data signal comprising the first data in the bandpass waveguide interconnect proximate the first location and propagating toward the second location; and
a second adaptor coupled to the bandpass waveguide interconnect for extracting an output bandpass data signal from the bandpass waveguide interconnect proximate the second location.

22. An apparatus comprising:
a first port for receiving an input data signal comprising first data;
a bandpass waveguide interconnect having a phase response and for supporting propagation of a bandpass data signal within a predetermined frequency band along a predetermined path between a first location and a second location;
a first adaptor coupled to the bandpass waveguide interconnect for exciting an input bandpass data signal comprising the first data in the bandpass waveguide interconnect proximate the first location and propagating toward the second location;
a second adaptor coupled to the bandpass waveguide interconnect for extracting an output bandpass data signal from the bandpass waveguide interconnect proximate the second location;
a third adaptor coupled to the bandpass waveguide interconnect for exciting other input bandpass data signal comprising second data in the bandpass waveguide interconnect proximate the first location and propagating toward the second location; and,
a fourth adaptor coupled to the bandpass waveguide interconnect for extracting a second output bandpass data signal comprising the second data from the bandpass waveguide interconnect proximate the second location; wherein the third adaptor and the first adaptor are each for exciting a different mode within the bandpass waveguide interconnect.

23. An apparatus according to claim 22 wherein the different modes consist of different $TE_{m0}$ modes.

24. An apparatus according to claim 23 wherein the different modes consist of a TE10 and a TE20.

25. An apparatus according to claim 24 wherein the first adaptor comprises a inter-layer conductor transition for exciting the TE10 mode and the third adaptor is for providing two out of phase field vectors at an input port of the bandpass waveguide interconnect for exciting the TE20 mode.

26. An apparatus according to claim 25 wherein the third adaptor comprises two coplanar microstrip to field transitions.

27. An apparatus according to claim 26 comprising:
a set of inter-layer conductors disposed along a path for separating signals provided at each of the two coplanar microstrip to field transitions to prevent the TE10 transmission mode from propagating into the transition of the TE20 transmission mode.

28. An apparatus according to claim 25 wherein the third adaptor comprises two microstrip to field transitions on opposing conductive planes, the opposing conductive planes defining two opposing boundaries of the bandpass waveguide interconnect.

29. An apparatus according to claim 25 comprising a strip of a conductive material having a predetermined width for conducting a data signal, the strip of conductive material disposed along at least a portion of the predetermined path within the waveguide interconnect between a location proximate the first location and a location proximate the second location.

30. A device as defined in claim 23 wherein the bandpass waveguide interconnect comprises:
first and a second conducting layers disposed on opposing sides of a dielectric substrate;
a first set of inter-layer conductors connecting the first and the second conducting layers, the first set disposed along a first path; and,
a second set of inter-layer conductors disposed along a second path spaced apart from the first path and forming a bounded region having a cross section defined by the first and second conducting layers on two sides and by the first and second set of inter-layer conductors on two other sides thereof.

31. A method comprising: providing a data signal; processing the data signal for generating a bandpass data signal within a predetermined frequency band; launching the bandpass data signal into a bandpass waveguide interconnect at a first location, the bandpass waveguide interconnect for supporting propagation of the bandpass data signal within the predetermined frequency band from a first location to a second location; extracting the bandpass data signal from the bandpass waveguide interconnect at a second location to provide an extracted bandpass data signal; processing the extracted bandpass data signal for recovering the data signal; and dispersion compensating one of the data signal and the extracted bandpass data signal by compensating a phase response of the bandpass waveguide interconnect.

32. A method according to claim 31 wherein dispersion compensating is performed prior to excitation of the bandpass data signal within the bandpass waveguide interconnect.

33. A method according to claim 31 wherein dispersion compensating is performed after extraction of the extracted bandpass data signal.

34. A method according to claim 31 comprising:
serializing a plurality of received parallel first data signals to provide the data signal; and,
de-serializing the extracted bandpass data signal.

35. A method according to claim 31 comprising:
multiplexing a plurality of received parallel first data signals to provide the data signal;
and, de-multiplexing the extracted bandpass data signal.

36. A method comprising:
providing a data signal;
processing the data signal for generating a bandpass data signal within a predetermined frequency band;
launching the bandpass data signal into a bandpass waveguide interconnect at a first location, the bandpass waveguide interconnect for supporting propagation of the bandpass data signal within the predetermined frequency band from a first location to a second location;
extracting the bandpass data signal from the bandpass waveguide interconnect at a second location to provide an extracted bandpass data signal;
processing the extracted bandpass data signal for recovering the data signal; and
performing orthogonal frequency division multiplexing on the bandpass data signal prior to providing same to the bandpass waveguide interconnect.

37. A method comprising:
providing a data signal;
processing the data signal for generating a bandpass data signal within a predetermined frequency band;
launching the bandpass data signal into a bandpass waveguide interconnect at a first location, the bandpass waveguide interconnect for supporting propagation of the bandpass data signal within the predetermined frequency band from a first location to a second location;
extracting the bandpass data signal from the bandpass waveguide interconnect at a second location to provide an extracted bandpass data signal;
processing the extracted bandpass data signal for recovering the data signal; and
exciting within the bandpass waveguide interconnect two modes simultaneously, each of the modes excited for propagating to guide the data signal comprising different data therein.

38. A method according to claim 37 wherein the two modes comprise a TEM mode and a TEm0 mode.

39. A method according to claim 37 wherein the two modes comprise two TEm0 modes.

40. A method according to claim 39 wherein the two modes comprise a TE10 mode and a TE20 mode.

41. A method comprising:
providing a data signal;
processing the data signal for generating a bandpass data signal within a predetermined frequency band;
launching the bandpass data signal into a bandpass waveguide interconnect at a first location, the bandpass waveguide interconnect for supporting propagation of the bandpass data signal within the predetermined frequency band from a first location to a second location;
extracting the bandpass data signal from the bandpass waveguide interconnect at a second location to provide an extracted bandpass data signal; and
processing the extracted bandpass data signal for recovering the data signal;
the bandpass waveguide interconnect traverses an other than straight path from the first location to the second location.

42. A method according to claim 41 wherein the other than straight path from the first location to the second location comprises at least one right angle turn.

43. A method comprising:
receiving a plurality of data signals;
processing the plurality of data signals for generating a first bandpass data signal within a predetermined first frequency band and second bandpass data signal within a second predetermined frequency band;
launching the first bandpass data signal into a bandpass waveguide interconnect such that the first bandpass data signal is transmitted using a first transmission mode;
launching the second bandpass data signal into the same bandpass waveguide interconnect such that the second bandpass data signal is transmitted using a second other transmission mode, the first and second bandpass data signals propagating through the bandpass waveguide interconnect simultaneously;
extracting the first bandpass data signal from the bandpass waveguide interconnect;
extracting the second bandpass data signal from the bandpass waveguide interconnect; and,
processing the extracted first and second bandpass data signal for recovering the plurality of data signals.

* * * * *